United States Patent
Katsube et al.

(10) Patent No.: US 6,341,127 B1
(45) Date of Patent: Jan. 22, 2002

(54) NODE DEVICE AND METHOD FOR CONTROLLING LABEL SWITCHING PATH SET UP IN INTER-CONNECTED NETWORKS

(75) Inventors: Yasuhiro Katsube, Kanagawa; Takeshi Saito, Tokyo-to; Yoshiaki Takabatake, Kanagawa-ken; Mikio Hashimoto, Chiba-ken; Hisako Tanaka, Tokyo-to, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/114,177

(22) Filed: Jul. 13, 1998

(30) Foreign Application Priority Data

Jul. 11, 1997 (JP) .............................. 9-186811

(51) Int. Cl.[7] .............................. H04Q 11/04
(52) U.S. Cl. .................. 370/352; 370/230; 370/360; 370/395; 370/401; 370/468
(58) Field of Search ................. 370/352, 230, 370/388, 351, 411, 422, 427, 355, 357, 360, 361, 381, 389, 392, 394, 412, 413, 428, 430, 395, 401, 402, 465, 468, 231; 709/238; 359/124

(56) References Cited

U.S. PATENT DOCUMENTS 4,995,032 A * 2/1991 Demichelis et al. ........ 370/230
5,949,778 A * 9/1999 Abu-Amara et al. ........ 370/338
5,996,021 A * 11/1999 Civanlar et al. ............ 709/238
6,026,092 A * 2/2000 Abu-Amara et al. ........ 370/411
6,157,634 A * 12/2000 Mehta et al. ................ 370/351
6,160,651 A * 12/2000 Chang et al. ................ 359/124

FOREIGN PATENT DOCUMENTS

EP 1009129 A2 * 6/2000 ........... H04L/12/46

* cited by examiner

Primary Examiner—Douglas Olms
Assistant Examiner—Shick Hom
(74) Attorney, Agent, or Firm—Foley & Lardner

(57) ABSTRACT

A router device for controlling label switching path set up is disclosed. In the router device, a policy information indicating a permitted starting point of a label switching path is stored, and a request message that contains a starting point information indicating a starting point node/network of the requested label switching path and a stream information indicating a desired packet stream to be transferred through the requested label switching path is received. Then, whether or not to permit the set up of the requested label switching path is judged by comparing the starting point information contained in the request message with the stored policy information, and the requested label switching path through the router device for the desired packet stream indicated by the stream information contained in the request message is set up when the set up of the requested label switching path is judged as permitted. Instead of the starting point information, a neighbor information, a stream information, or an ending point information may be used.

31 Claims, 17 Drawing Sheets

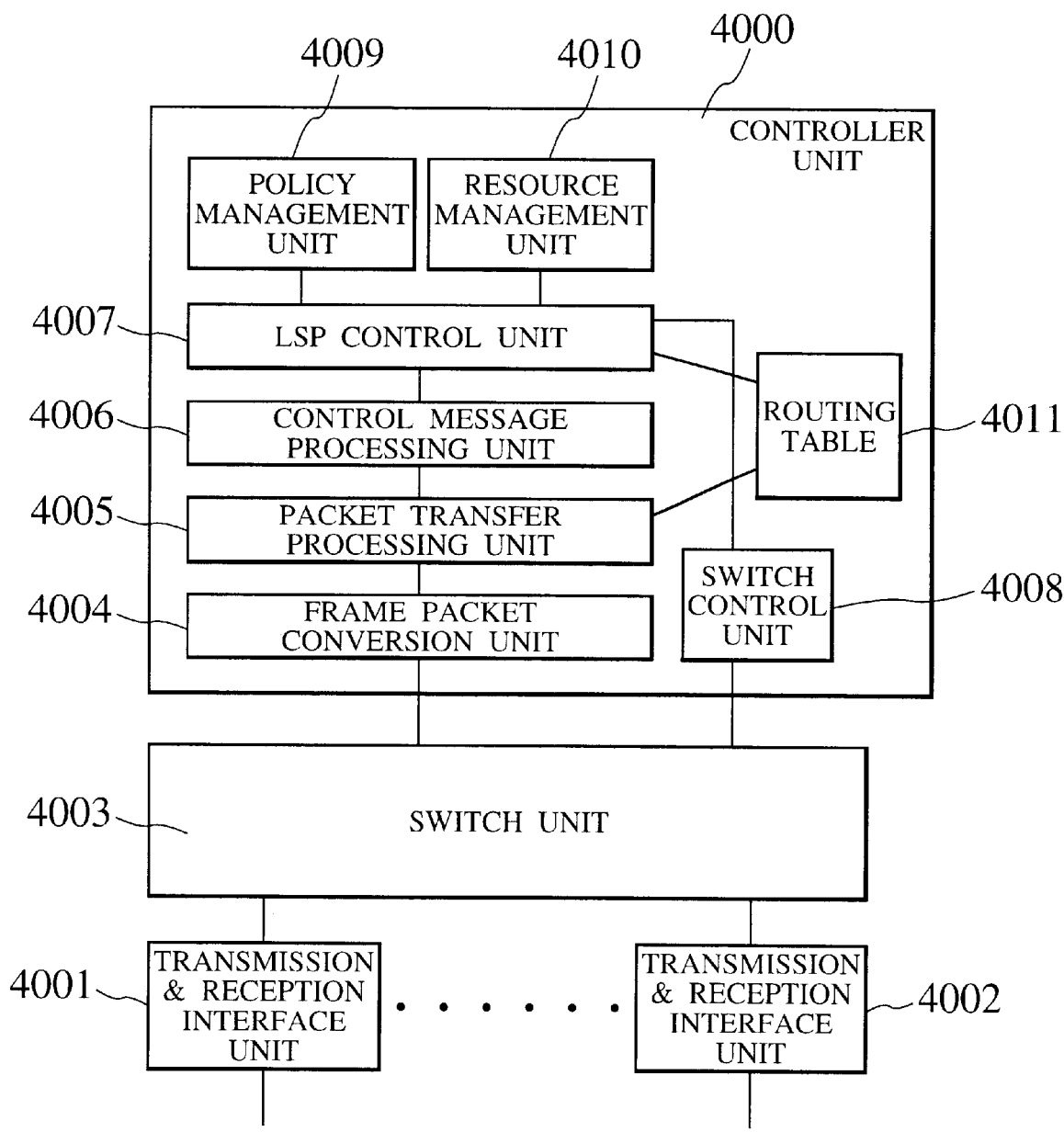

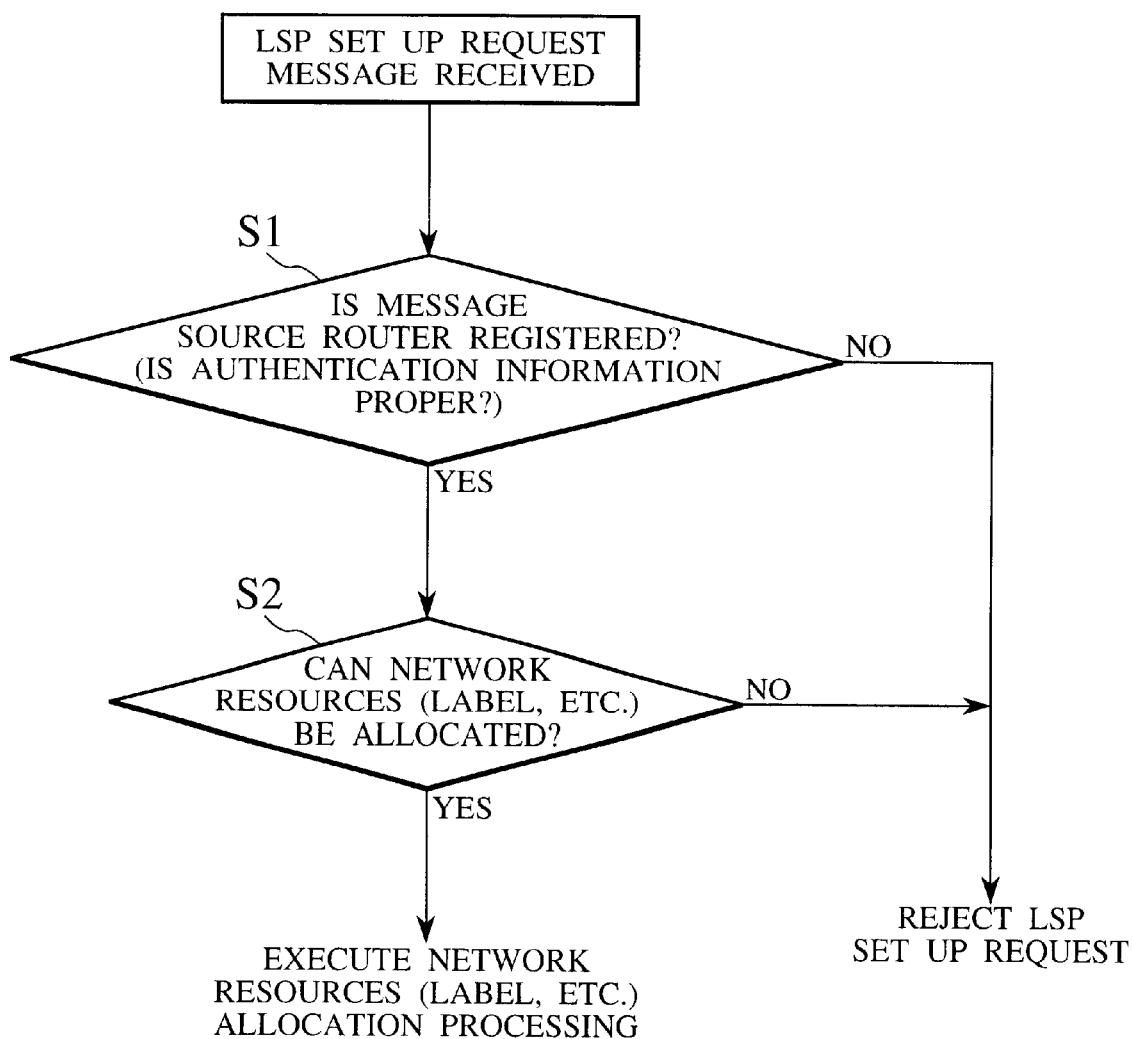

FIG. 5

| NEIGHBORING ROUTER INFORMATION | STREAM INFORMATION (SOURCE INFORMATION, DESTINATION INFORMATION) | PERMITTED CoS VALUE |
|---|---|---|
| 133.199.19.0 | * | LOW |
| 133.198.98.0 | (src.=133.196/16,dst.=*) | * |
|  | (src.=133.195/16,dst.=*) | * |
|  |  |  |

FIG. 8

| STARTING POINT NODE INFORMATION | STREAM INFORMATION | CoS VALUE |
|---|---|---|
| ROUTER 1021 | * | * |

FIG. 10

| STARTING POINT NODE INFORMATION | STREAM INFORMATION | CoS VALUE |
|---|---|---|
| ROUTER 1021 | (src. prefix=1022) | * |

FIG. 16

| INPUT | OUTPUT |
|---|---|
| APARTMENT BACKBONE NETWORK SIDE 1394 ISOCHRONOUS CHANNEL #x  6Mbps | HOME BACKBONE NETWORK SIDE 1394 ISOCHRONOUS CHANNEL #y  6Mbps |

FIG. 18

| LIST OF USER/DEVICE FOR WHICH LABEL SWITCHING IS TO BE PERMITTED |
|---|
| ADDRESS OF HOME ROUTER 110 |
|  |

NODE DEVICE AND METHOD FOR CONTROLLING LABEL SWITCHING PATH SET UP IN INTER-CONNECTED NETWORKS

BACKGROUND OF THE INVENTION

1. Field of the Invention

The present invention relates to a node device and a method for controlling label switching path set up in inter-connected networks that utilize the label switching scheme.

2. Description of the Background Art

In the inter-connected networks such as backbones of campus networks or enterprise networks, or networks of network carriers or Internet service providers (ISP), it is possible to carry out the so called label switching at a node device such as a router for carrying out layer 3 packet communication such as that of IP (Internet Protocol), in which control information for allocating specific channel identifiers (labels) to specific packet streams is exchanged between nodes, and an input side label (and an input interface) and an output side label (and an output interface) allocated to individual stream are stored in each node, such that the actual packet transfer processing (switching processing) can be carried out according to correspondences among stored label values. In general, the label has a fixed length so that it becomes possible to realize a faster processing compared with a conventional scheme of transferring packets by analyzing variable length packet header information (such as a destination IP address pre-fix) while it also becomes possible to realize a flexible routing control.

The concrete applications of the label switching scheme include a case of applying it to the existing switching network such as that of ATM or frame relay, and a case of newly defining a label header to be used by a label switch and connecting the switch to LAN such as IEEE 802.3/Ethernet or PPP-over-SONET link.

A path through which packets are transferred by this label switching is called a label switching path (LSP). A node (a router or a host) that is a starting point of the LSP carries out transmission by assigning the identical label value to each packet stream defined from the header information of packets to be transmitted, while a router that is a relay point carries out transmission by determining an interface and a label value to which the packets are to be transmitted by referring to a label value of the received packet, and a node that is an ending point of the LSP carries out transmission by deleting the label of the received packet and determining an interface to which the packet is to be transmitted by referring to the header information.

By transferring packets using the LSP, it becomes possible for the router at a relay point of the LSP to carry out the packet transfer without referring to the headers of the layer 3 and the upper layer, so that it becomes possible to realize the improved transfer performance and the flexible routing control.

However, the use of LSP is also associated with the following problems. In the following description, physical or logical network units operated under the identical management policy such as the specific campus networks, enterprise networks, or ISP networks, will be referred to as network segments (or segments for short).

First, it is impossible for a relay router of the LSP to carry out the filtering processing (a processing for judging whether a received packet is to be transferred further or not according to the header information of the layer 3 and the upper layer) that has been carried out for each packet by a conventional router. This filtering processing has been carried out mainly for the purpose of limiting packets that flow into or out of some segment to those related to a specific source or destination, or those related to a specific upper layer protocol, in view of the security. When the LSP is used, the packet header cannot be referred if a relay point of the LSP is located at a boundary of segments, so that it becomes impossible to carry out this filtering processing.

Also, conventionally, neighboring segments have been determining a policy as to whether each one should carry out a relaying of packets from another by a mutual contract or the like, and carrying out the packet transfer permit/reject control (peering control) through a routing protocol according to the result of that determination (by not giving the routing information to a specific neighboring segment or by notifying the own preference regarding the segment passing along with the routing information). Although it is possible to carry out the similar control through the routing protocol even for the LSP set up that extends over segments, it is currently impossible to limit the LSP set up with respect to the neighboring segment according to conditions different from those of the routing protocol.

For example, since the label resource for the label switching is finite, there can be cases in which it is desired to execute such a policy control that the hop-by-hop packet relay transfer as carried out the ordinary router can still be carried out but the packet transfer based on LSP (the LSP set up that extends over segments) is limited. However, it is impossible to realize such a policy regarding the LSP set up according to the currently used routing protocol.

SUMMARY OF THE INVENTION

It is therefore an object of the present invention to provide a node device and a method for controlling label switching path set up, which are capable of maintaining the equivalent security function as the filtering function that has been carried out for each packet by a conventional router, by limiting the LSP set up and/or packet streams transferred by the LSP (which are identified by the address information such as source/destination addresses. the information regarding the upper layer, etc.), even in the case utilizing the label switching.

It is another object of the present invention to provide a node device and a method for controlling label switching path set up, which are capable of realizing the control regarding packet transfer with respect to the neighboring segment as realized in the conventional case while also realizing the control regarding the LSP set up permit/reject with respect to the neighboring segment or the control regarding acceptance permit/reject for packet streams flowing on the LSP, even in the case utilizing the label switching.

According to one aspect of the present invention there is provided a router device, comprising: a switch unit for carrying out a label switching with respect to entered packets according to a correspondence between an input side label for identifying a channel from which a packet stream is to be entered and an output side label for identifying a channel from which the packet stream is to be outputted; a memory unit for storing a policy information indicating a permitted starting point of a label switching path for which a packet transfer by the label switching is to be permitted; a receiving unit for receiving a request message for requesting a set up of a requested label switching path through the router device, the request message containing a starting point information indicating a starting point node/network of the requested label switching path and a stream information indicating a desired packet stream to be transferred through the requested label switching path; and a control unit for judging whether or not to permit the set up of the requested label switching path by comparing the starting point information contained in the request message as received by the receiving unit with the policy information as stored in the memory unit, and setting up the requested label switching path through the router device for the desired packet stream indicated by the stream information contained in the request message as received by the receiving unit when the set up of the requested label switching path is judged as permitted.

According to another aspect of the present invention there is provided a router device, comprising: a switch unit for carrying out a label switching with respect to entered packets according to a correspondence between an input side label for identifying a channel from which a packet stream is to be entered and an output side label for identifying a channel from which the packet stream is to be outputted; a memory unit for storing a policy information indicating a permitted neighboring node/network from which a packet transfer by the label switching is to be permitted; a receiving unit for receiving a request message for requesting a set up of a requested label switching path through the router device, the request message containing a message source information indicating a source of the request message and a stream information indicating a desired packet stream to be transferred through the requested label switching path; and a control unit for judging whether or not to permit the set up of the requested label switching path by comparing the message source information contained in the request message as received by the receiving unit with the policy information as stored in the memory unit, and setting up the requested label switching path through the router device for the desired packet stream indicated by the stream information contained in the request message as received by the receiving unit when the set up of the requested label switching path is judged as permitted.

According to another aspect of the present invention there is provided a router device, comprising: a switch unit for carrying out a label switching with respect to entered packets according to a correspondence between an input side label for identifying a channel from which a packet stream is to be entered and an output side label for identifying a channel from which the packet stream is to be outputted; a memory unit for storing a policy information indicating a permitted packet stream for which a packet transfer by the label switching is to be permitted; a receiving unit for receiving a request message for requesting a set up of a requested label switching path through the router device, the request message containing a stream information indicating a desired packet stream to be transferred through the requested label switching path; and a control unit for judging whether or not to permit the set up of the requested label switching path by comparing the stream information contained in the request message as received by the receiving unit with the policy information as stored in the memory unit, and setting up the requested label switching path through the router device for the desired packet stream indicated by the stream information contained in the request message as received by the receiving unit when the set up of the requested label switching path is judged as permitted.

According to another aspect of the present invention there is provided a router device, comprising: a switch unit for carrying out a label switching with respect to entered packets according to a correspondence between an input side label for identifying a channel from which a packet stream is to be entered and an output side label for identifying a channel from which the packet stream is to be outputted; a memory unit for storing a policy information indicating a permitted ending point of a label switching path for which a packet transfer by the label switching is to be permitted; a receiving unit for receiving a request message for requesting a set up of a requested label switching path through the router device, the request message containing a stream information indicating a desired packet stream to be transferred through the requested label switching path; and a control unit for judging whether or not to permit the set up of the requested label switching path by comparing an ending point information, which is either contained in the request message as received by the receiving unit or derived from the stream information contained in the request message as received by the receiving unit, with the policy information as stored in the memory unit, and setting up the requested label switching path through the router device for the desired packet stream indicated by the stream information contained in the request message as received by the receiving unit when the set up of the requested label switching path is judged as permitted.

According to another aspect of the present invention there is provided a method for controlling label switching path set up at a router device, comprising the steps of: storing a policy information indicating a permitted starting point of a label switching path for which a packet transfer by a label switching is to be permitted; receiving a request message for requesting a set up of a requested label switching path through the router device, the request message containing a starting point information indicating a starting point node/network of the requested label switching path and a stream information indicating a desired packet stream to be transferred through the requested label switching path; judging whether or not to permit the set up of the requested label switching path by comparing the starting point information contained in the request message as received by the receiving step with the policy information as stored by the storing step; and setting up the requested label switching path through the router device for the desired packet stream indicated by the stream information contained in the request message as received by the receiving step when the set up of the requested label switching path is judged as permitted by the judging step.

According to another aspect of the present invention there is provided a method for controlling label switching path set up at a router device, comprising the steps of: storing a policy information indicating a permitted neighboring node/network from which a packet transfer by a label switching is to be permitted; receiving a request message for requesting a set up of a requested label switching path through the router device, the request message containing a message source information indicating a source of the request message and a stream information indicating a desired packet stream to be transferred through the requested label switching path; judging whether or not to permit the set up of the requested label switching path by comparing the message source information contained in the request message as received by the receiving step with the policy information as stored by the storing step; and setting up the requested label switching path through the router device for the desired packet stream indicated by the stream information contained in the request message as received by the receiving step when the set up of the requested label switching path is judged as permitted by the judging step.

According to another aspect of the present invention there is provided a method for controlling label switching path set up at a router device, comprising the steps of: storing a policy information indicating a permitted packet stream for which a packet transfer by a label switching is to be permitted; receiving a request message for requesting a set up of a requested label switching path through the router device, the request message containing a stream information indicating a desired packet stream to be transferred through the requested label switching path; judging whether or not to permit the set up of the requested label switching path by comparing the stream information contained in the request message as received by the receiving step with the policy information as stored by the storing step; and setting up the requested label switching path through the router device for the desired packet stream indicated by the stream information contained in the request message as received by the receiving step when the set up of the requested label switching path is judged as permitted by the judging step.

According to another aspect of the present invention there is provided a method for controlling label switching path set up at a router device, comprising the steps of: storing a policy information indicating a permitted ending point of a label switching path for which a packet transfer by a label switching is to be permitted; receiving a request message for requesting a set up of a requested label switching path through the router device, the request message containing a stream information indicating a desired packet stream to be transferred through the requested label switching path; judging whether or not to permit the set up of the requested label switching path by comparing an ending point information, which is either contained in the request message as received by the receiving step or derived from the stream information contained in the request message as received by the receiving step, with the policy information as stored by the storing step; and setting up the requested label switching path through the router device for the desired packet stream indicated by the stream information contained in the request message as received by the receiving step when the set up of the requested label switching path is judged as permitted by the judging step.

Other features and advantages of the present invention will become apparent from the following description taken in conjunction with the accompanying drawings.

BRIEF DESCRIPTION OF THE DRAWINGS

FIG. 2 is a block diagram showing an exemplary functional configuration of a label switch router device according to the first embodiment of the present invention.

FIG. 3 is a flow chart for the operation of a label switch router device in a first exemplary case of a method for controlling label switching path set up according to the first embodiment of the present invention.

FIG. 5 is a diagram showing an exemplary format of a policy table that can be used in the first exemplary case of FIG. 3.

FIG. 8 is a diagram showing one exemplary format of a policy table that can be used in a fourth exemplary case of a method for controlling label switching path set up according to the first embodiment of the present invention.

FIG. 10 is a diagram showing another exemplary format of a policy table that can be used in a fourth exemplary case of a method for controlling label switching path set up according to the first embodiment of the present invention.

FIG. 16 is a diagram showing an exemplary format of a setting table used by the home router in the operation of FIG. 15.

FIG. 18 is a diagram showing an exemplary format of a policy table used by the home router in the operation of FIG. 17.

DETAILED DESCRIPTION OF THE PREFERRED EMBODIMENTS

Now, the preferred embodiments of a node device and a method for controlling label switching path set up according to the present invention will be described in detail.

As described below, the present invention makes it possible to control the label switching path set up such that, when it is desirable for some segment not to carry out any packet stream transmission and reception from/to all external segments or to carry out packet transmission and reception with external segments only for a specific packet stream (specified by a transmission and reception address, application, etc.), for example, the set up of an LSP that has a node outside of that segment as a starting/ending point is permitted only when it is certain that a specific stream alone will be transferred.

Also, the present invention makes it possible to control the label switching path set up such that, when it is desirable for some segment to carry out packet stream transmission and reception using LSP only with respect to a specific segment and not to carry out packet transmission and reception or carry out the filtering for each packet with respect to any other segments, for example, the set up of only an LSP that has a node within that specific segment as a starting/ending point is permitted. Moreover, when it is desirable to carry out packet transmission and reception only for a specific packet stream with respect to a specific segment, the set up of an LSP with respect to that specific segment is permitted only when it is certain that a specific stream alone will be transferred between this segment and that specific segment.

In addition, the present invention can also deal with cases in which it is desirable for some segment to limit the set up of LSP that extends over the other segments according to neighboring segments, rather than the starting/ending point of the LSP, such that the set up of LSP is limited only to: (1) an LSP that extends over a specific neighboring router of a specific neighboring segment that is specified in advance by a contract and the like; (2) an LSP for carrying a specific stream that extends over a specific neighboring segment that is specified in advance by a contract and the like; or (3) both of (1) and (2).

In the following, the preferred embodiments of the present invention will be described for the case of limiting a range for setting up the LSP and/or for the case of limiting packet streams that can utilize the LSP, in a wide area IP network formed by campus/enterprise networks and the like.

Referring now to FIG. 1 to FIG. 10, the first embodiment of a node device and a method for controlling label switching path set up according to the present invention will be described in detail.

Figure 1:
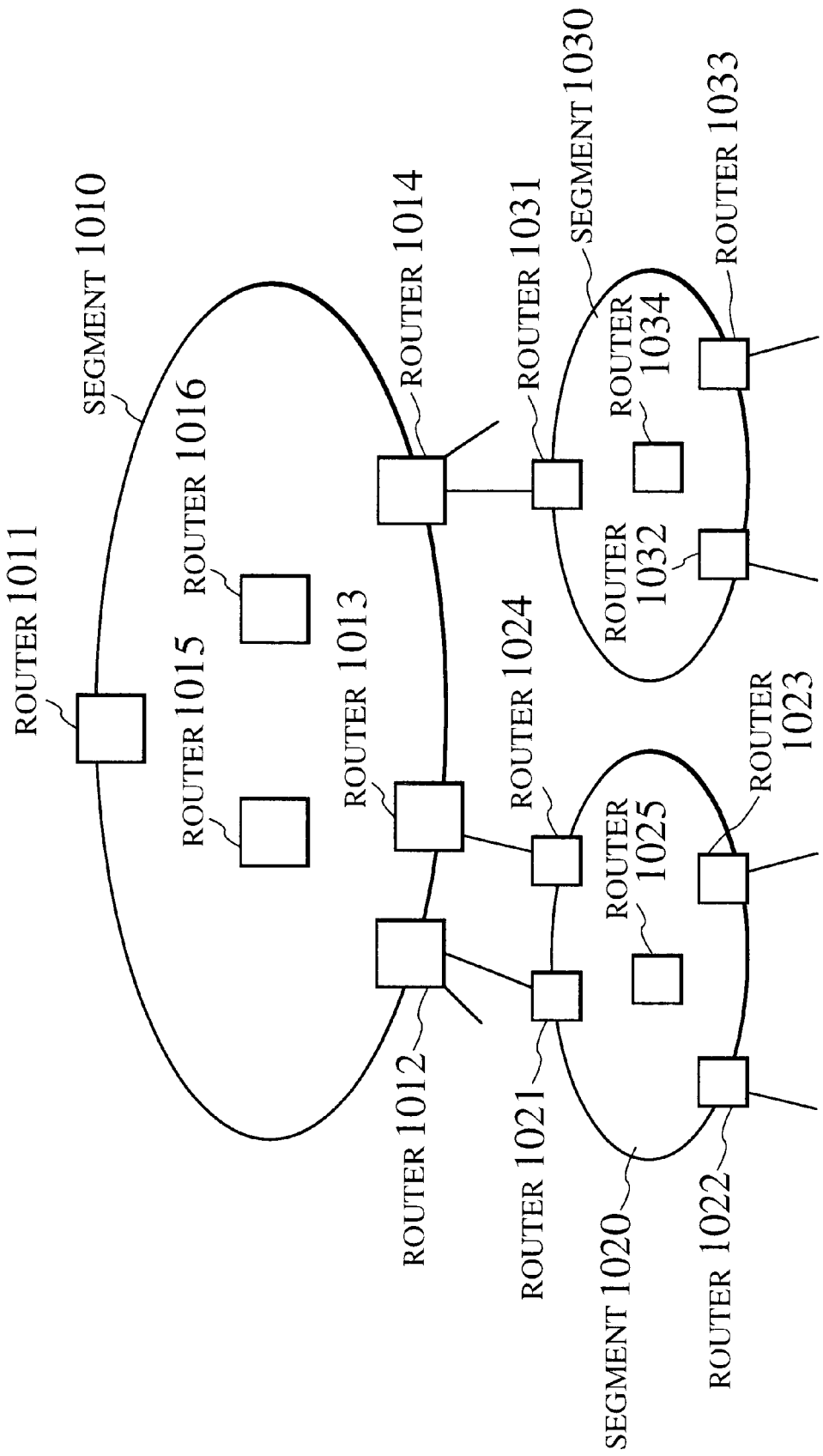
FIG. 1 is a schematic block diagram of a wide area IP network using a router device and a method for controlling label switching path set up according to the first embodiment of the present invention.

FIG. 1 shows an overall configuration of a wide area IP network that includes a segment 1010 formed by boundary routers 1011, 1012, 1013 and 1014 and internal routers 1015 and 1016, a segment 1020 formed by boundary routers 1021, 1022, 1023 and 1024 and an internal router 1025, and a segment 1030 formed by boundary routers 1031, 1032 and 1033 and an internal router 1034, where the segments 1010 and 1020 are inter-connected at two locations (between the boundary routers 1012 and 1021 and between the boundary routers 1013 and 1024).

Note here that, in the following, neighboring routers can be those routers which are directly connected by a physical link or those routers which are connected by some logical link (such as a virtual connection of the datalink layer or a tunnel formed by LSP).

FIG. 2 shows an exemplary functional configuration of a label switch router according to the present invention, which constitutes each router in the wide area IP network of FIG. 1. This label switch router of FIG. 2 comprises transmission and reception interface units 4001 to 4002 for carrying out transmission and reception of ATM cells, frame relay frames, or frames to which label headers of some other format are attached; a switch unit 4003 for transferring a frame received at each transmission and reception interface unit to another transmission and reception interface unit determined according to a label value of the received frame; and a controller unit 4000.

The controller unit 4000 further comprises a frame packet conversion unit 4004 for extracting a layer 3 packet from a labelled frame or vice versa; a packet transfer processing unit 4005 for carrying out a layer 3 packet transfer processing (an optional processing for transfer to a specific next hop node according a routing table 4011 in the case of a data packet or a processing for transfer to a control message processing unit 4006 in the case of a control packet); a control message processing unit 4006 for carrying out a transmission and reception processing for messages related to the LSP control (such as set up/release, neighbor recognition) and a notification to an LSP control unit 4007; an LSP control unit 4007 for carrying out a processing related to a state management or a set up/release control for LSPs; a switch control unit 4008 for carrying out a control such as change of the configuration of the switch unit 4003 in conjunction with the LSP set up/release; a policy management unit 4009 for storing policy based rules related to an LSP set up permit/reject judgement to be described below; a resource management unit 4010 for storing a resource utilization state in order to judge whether it is possible to set up an LSP or not from a viewpoint of network resources such as label values and communication bandwidths; and a routing table 4011 for storing a routing information to be managed according to the layer 3 routing protocol.

Now, the exemplary LSP set up control procedures according to the present invention will be described for five different cases.

<<Case of controlling an LSP set up permit/reject judgement depending on a neighboring segment (a neighboring router)>>

As a first exemplary case, the case in which a router for carrying out the label switching stores a policy as to whether to permit or reject the LSP set up for each neighboring router, and controls the LSP set up permit/reject judgement according to the stored content will be described. In this case, it is assumed that in FIG. 1 one boundary router 1012 of the segment 1010 offers the LSP providing service with respect to the segment 1020 (the boundary router 1021) but the other boundary router 1013 of the segment 1010 does not offer the LSP providing service with respect to the segment 1020 (the boundary router 1024), among the two connection points between the segments 1010 and 1020, for example.

First, the boundary router 1012 of the segment 1010 and the boundary router 1021 of the segment 1020 execute a neighbor recognition procedure as neighboring nodes for carrying out the LSP control. This neighbor recognition procedure can be realized, for example, by exchanging a HELLO message containing an identifier such as own address and a response message with respect to that HELLO message, and continually checking the neighbor recognition using KEEP ALIVE messages. Messages exchanged by this neighbor recognition procedure may contain an authentication information (such as a password or a bit sequence obtained by encrypting an information content using a specific key) for the purpose of enabling each router to check whether the other router is a contracted neighboring router or not. After this neighbor recognition procedure, a session for the purpose of exchanging various control messages for the actual LSP set up, release, route change, etc. between the boundary routers 1012 and 1021 is established, so that the exchange of various control messages becomes possible subsequently through that session.

Next, the operation in the case where the boundary router 1021 of the segment 1020 transmits an LSP set up request message to the boundary router 1012 of the segment 1010 for the sake of a specific packet stream to be transferred from the segment 1020 toward a direction of the segment 1010 will be described with reference to FIG. 3.

Figure 4A:
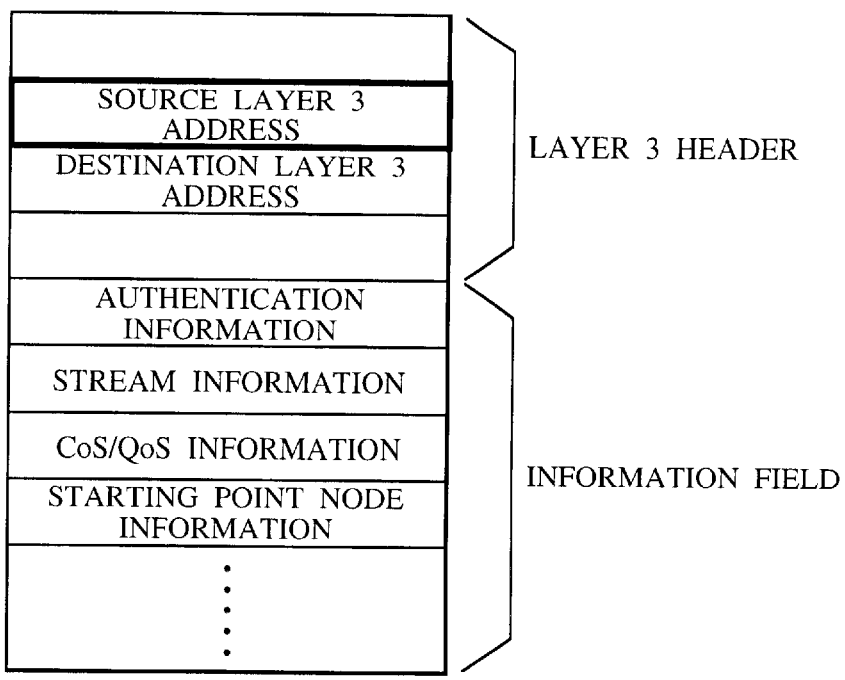
FIGS. 4A and 4B are diagrams showing exemplary contents of a label switching path set up request message that can be used in the first exemplary case of FIG. 3.
Figure 4B:
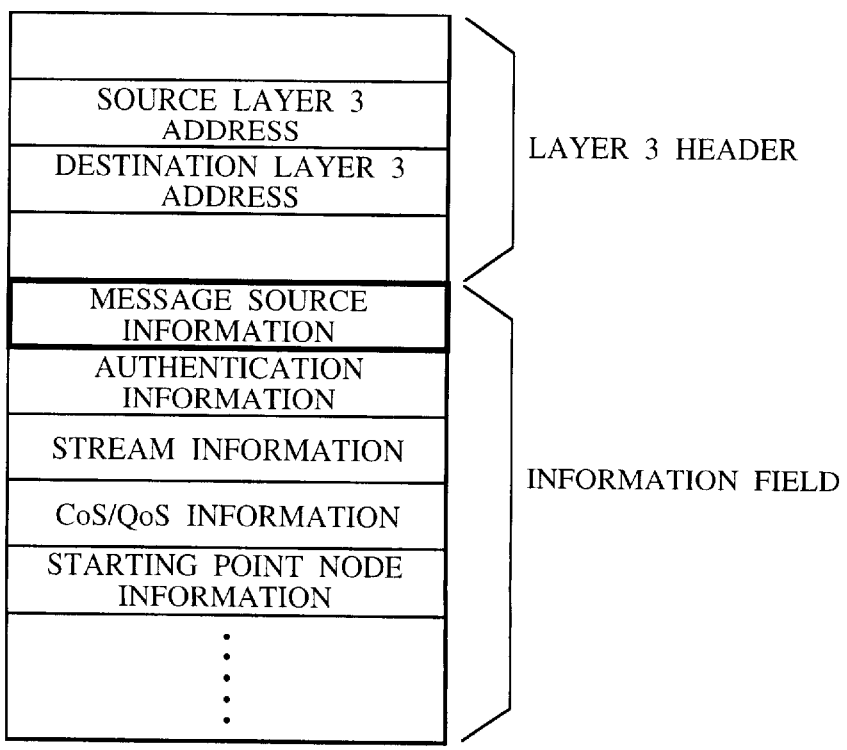

In this case, as shown in FIG. 4A or FIG. 4B, the information contained in the LSP set up request message includes an information regarding a stream to be transferred through the LSP, an information regarding a CoS (Class of Service) desired to be realized, an information indicating a source of the message, etc. In addition, as in the other example described below, an information indicating a starting point of the LSP may also be contained. Here, the message source information may be extracted from the source layer 3 address described within a header of the LSP set up request message as in the case of FIG. 4A, or may be described in an information field of the LSP set up request message as in the case of FIG. 4B.

Upon receiving the LSP set up request message, at the step S1 of FIG. 3, the LSP control unit 4007 of the boundary router 1012 extracts the message source information (and the CoS information if necessary) first, and inquires the policy management unit 4009 as to whether it is a message from a node for which the LSP relay should be provided or not. Note that, in this example, the stream information is not used for the judgement at the policy management unit 4009.

In response, the policy management unit 4009 refers to a policy table as shown in FIG. 5, and checks whether a node indicated by the message source information is registered in this policy table or not. Here, as shown in FIG. 5, the policy table contains a list of information (such as layer 3 address) for identifying those neighboring routers for which the LSP set up (relay) should be provided. In addition, in the case of limiting streams that can utilize that LSP as well, as in the other example described below, the policy table also contains a stream information for a permitted stream (which is to be left unspecified in the case of not limiting streams). Also, in the case of limiting CoS values to be provided in that LSP, as in the other example described below, the policy table also contains a permitted CoS value (which is to be left unspecified in the case of not limiting CoS values).

As a result of referring to the policy table, whether the source of the LSP set up request message is the boundary router 1021 of the segment 1020 for which the LSP should be provided according to a contract and the like established in advance or not is Judged (and the verification of the authentication information is carried out in the case where the authentication information is contained in the LSP set up request message). In addition, in the case where a requested CoS is also contained in the LSP set up request message, the requested CoS value is compared with the permitted CoS value registered in the policy table, and the acceptance permit/reject is judged.

When the source of the LSP set up request message is other than the registered router of the contracted segment (or when the requested CoS value contained in the message differs from (or higher than) the permitted CoS value registered in the policy table), the LSP control unit 4007 rejects the LSP set up request, and returns a message for notifying a rejection (which may also contain a reason for rejection described therein) from the control message processing unit 4006 if necessary. Here, it is also possible to make an advance agreement that no special message is to be returned in such a case. In that case, the source node can judge that the request is rejected either from the fact that no response message is returned immediately or from the fact that no response message is returned even after re-transmitting the request messages for a prescribed number of times. Note that the same remarks concerning the notification equally apply to the second to fourth examples to be described below.

Note also that the LSP set up request message may contain the authentication information for the purpose of enabling the message receiving side to check whether the message source is surely a proper source or not. In such a case, whether or not to accept the received message is judged by checking the message source information as well as the authentication information at the LSP control unit 4007.

When it is judged that it is permitted to process the received LSP set up request message as a result of the above described comparison of the message source information (and the CoS value if necessary) contained in the received message with the policy table, next at the step S2 of FIG. 3, the boundary router 1012 inquires the resource management unit 4010 as to whether it is possible to secure necessary network resources such as label (and bandwidth if necessary) or not, so as to judge whether it is possible to accept this LSP set up request. When it is judged that it is possible to accept this LSP set up request, either a message indicating the acceptance of the LSP set up request (which contains an information on a label assigned to the requested stream, etc.) is returned to the boundary router 1021, or the similar LSP set up request message is transmitted from the control message processing unit 4006 to a next hop (downstream) router (such as a router 1015 in the exemplary case shown in FIG. 1) for the requested stream.

Subsequently, each downstream side router such as router 1015 or 1016 may carry out exactly the same procedure for checking the policy information such as the message source information and checking the network resources as done by the boundary router 1012, with respect to the LSP set up request received from the upstream side neighboring router. When it is guaranteed that the received message is a message received from the neighboring router within the same segment, each downstream side router may omit the checking of the message source information. For example, when the interface through which the router 1015 received the message is connected to the router 1012 of the same segment by a point-to-point link, it is virtually impossible for the other router outside the segment to send the message to the router 1015 by pretending to be a router inside the segment, so that the authentication of the message source information at the router 1015 may be unnecessary. On the other hand, when the router 1015 is connected with the router 1012 through a switch or the like and the router 1015 can be directly connected with a router outside the segment through that switch, there is a possibility for a router outside the segment to send the message to the router 1015 by pretending to be the router 1012, so that it may be preferable to carry out the checking of the message source information at the router 1015 similarly as in-the boundary router 1012.

With respect to a neighboring router other than the registered router of the contracted segment, the LSP set up is rejected by the procedure such as: (1) the neighbor recognition procedure as neighboring routers of the label switching is carried out similarly as in the case of the registered router, but at a time of processing the individual LSP set up request, the request is rejected upon checking the message source information; (2) the neighbor recognition procedure is carried out according to the prescribed protocol procedure, but the rejection of the LSP set up request is explicitly indicated in that neighbor recognition procedure; (3) the neighbor recognition procedure or a subsequent procedure for establishing a session for control messages itself is refused.

Note that the above description has been directed to an exemplary case in which a router that received the LSP set up request message returns a message indicating an acceptance to the upstream node while transmitting the LSP set up request message to the downstream node when it is judged that it is possible to accept the received request, but there are many variations to the procedure for response message exchange in the general label switching protocols, and the present Invention is equally applicable to any of them.

For example, it is possible to adopt a procedure in which, when it is judged that it is possible to accept the received request, the sending of the LSP set up request message to the downstream node is sequentially carried out by the respective nodes first, without transmitting a message indicating the acceptance to the upstream node, and then a message indicating the acceptance is sequentially notified toward the upstream side from the most downstream side node of the label switching path that is set up (that is, each node transmits the message indicating the acceptance to the upstream node when the message indicating the acceptance is received from the downstream node). It is also possible to adopt a procedure in which, when the judgement of the rejection is made at the immediately downstream side node of one node, this one node transmits a message indicating the acceptance to the upstream node so as to set up the LSP within a range where it is possible to set up the LSP, or this one node transmits a message notifying the rejection to the upstream node so as not to set up any LSP. In the latter case, upon receiving the message notifying the rejection from the downstream side, the other node transmits the message notifying the rejection to the upstream node even when the judgement of the acceptance has been made at that other node. There are many other variations besides those mentioned above. Note that the same remarks concerning the response message exchange procedure equally apply to the second to fourth examples to be described below.

Note that the policy table of FIG. 5 is given in a format capable of containing an information as to whether the set up of only those LSPs of the best effort policy (the low communication class) which do not request any communication quality are to be permitted or the set up of those LSPs that realize prescribed communication quality classes or some specific communication quality values are also to be permitted. When such an information is contained, the exchange and negotiation of auxiliary information regarding the contract conditions for communication quality between the segments may also be carried out in the neighbor recognition procedure or a subsequent procedure for establishing a session for control messages described above.

Note also that the policy table of FIG. 5 is given in a format capable of containing an information regarding the packet streams for which LSPs can be provided, and an exemplary case of utilizing this information will be described below as a second exemplary case. The first exemplary case described above is directed to the case of judging the LSP set up permit/reject only from the neighboring router information (and the communication quality information), without utilizing the stream information (in a wild card fashion) so that the policy table to be used in this first exemplary case may be formed by a field for the neighboring router information (and a field for the permitted CoS value) alone.

When the boundary router 1012 that has rejected the LSP set up request for some packet stream for some reason receives a packet (without a label attached thereto) from the boundary router whose LSP set up request has been rejected, the received packet is either discarded (by refusing even the reception of the packet), or transferred toward the next hop router 1015 that is selected by carrying out the conventional network layer header processing (by carrying out the hop-by-hop transfer processing), or else transferred to an LSP that is set up with this boundary router 1012 as the starting point, by the packet transfer processing unit 4005 or the switch unit 4003.

When the boundary router 1012 receives a packet that belongs to a packet stream for which the LSP set up request is rejected because the non-registered communication quality class is requested, if there exists some LSP that satisfies the definition of that packet stream among the other LSPs (of low quality) that are set up with the boundary router 1012 as the starting point or from the boundary router 1021 with the boundary router 1012 as a relay point, it is also possible to transfer the received packet to that LSP by carrying out the network layer processing. Alternatively, it is also possible to adopt a scheme such that, when the non-registered communication quality class is requested, the boundary router 1012 sets the upstream side label in correspondence to the downstream side low quality label and transfers the received packet to another LSP that has the boundary router 1012 as a relay point, that satisfies the definition of that packet stream and that is different from the requested LSP, without carrying out the network layer processing to that packet.

<<Case of controlling an LSP set up permit/reject judgement depending on a neighboring segment (a neighboring router) and a stream information>>

Next, as a second exemplary case, the case in which a label switching router stores a policy as to whether to permit or reject the LSP set up (relay) for each neighboring router and for which packet stream the LSP set up should be permitted, and controls the LSP set up permit/reject judgement according to the stored content will be described. In this case, it is assumed that in FIG. 1 one boundary router 1012 of the segment 1010 offers the LSP providing service limited to some specific packet stream with respect to traffic from the segment 1020 while the other boundary router 1013 of the segment 1010 offers the LSP providing service limited to another specific packet stream with respect to traffic from the segment 1020, among the two inter-connection points between the segments 1010 and 1020, for example.

Here, the packet stream can be defined by either one or both of an information regarding a source of data packets (source host address, or source network address, or a set of source host address, a protocol and a port number, etc.) and an information regarding a destination of data packets (destination host address, or destination network address, or a set of a destination host address, a protocol and a port number, or an exit router of some routing domain, etc.).

First, similarly as in the first exemplary case, the neighbor recognition procedure as neighboring nodes for carrying out the control for LSP set up, release, etc. is executed between the boundary router 1012 of the segment 1010 and the boundary router 1021 of the segment 1020 as well as between the boundary router 1013 of the segment 1010 and the boundary router 1024 of the segment 1020. Similarly as in the first exemplary case, messages exchanged by this neighbor recognition procedure contain an identifier such as address of each router and if necessary an authentication information (such as a password or a bit sequence obtained by encrypting an information content using a specific key) for the purpose of enabling each router to check whether the other router is a contracted neighboring router or not.

A policy regarding for which packet stream the LSP set up should be requested (or the LSP set up should be permitted) is determined by the off-line contract or the like, and the determined content is registered in the policy table as shown in FIG. 5 to be referred by the policy management unit 4009 within the boundary routers 1012 and 1013 (as well as within the internal routers 1015, 1016, etc., if necessary). This registered content may be set up manually at the individual router, or distributed by some procedure from a specific node (such as the neighbor recognition procedure, the procedure for establishing a session for control message exchange, or some other procedure for information distribution (such as multicast)).

For example, in the case of realizing a traffic dispersion by transferring a packet stream to be transmitted from a source that has a network address connected to the boundary router 1022 of the segment 1020 through a route passing the boundary routers 1021 and 1012 while transferring a packet stream to be transmitted from a source that has a network address connected to the boundary router 1023 of the segment 1020 through a route passing the boundary routers 1024 and 1013, the content to that effect is determined by the off-line contract or the neighbor recognition procedure, and stored into the policy table of the boundary routers 1012 and 1013. Here, when the route of the LSP is different from a route determined by the ordinary routing protocol, the LSP set up request message may explicitly contain a route information including a starting node and an ending node (a specification of a route passing through the routers 1022, 1025, 1021 and 1012, for example) so that the LSP for each stream can be set up on the desired route as specified.

Next, the operation In the case where the boundary router 1021 of the segment 1020 transmits an LSP set up request message to the boundary router 1012 of the segment 1010 for the sake of a specific packet stream to be transferred from the boundary router 1021 of the segment 1020 toward a direction of the segment 1010 will be described with reference to FIG. 6.

Figure 6:
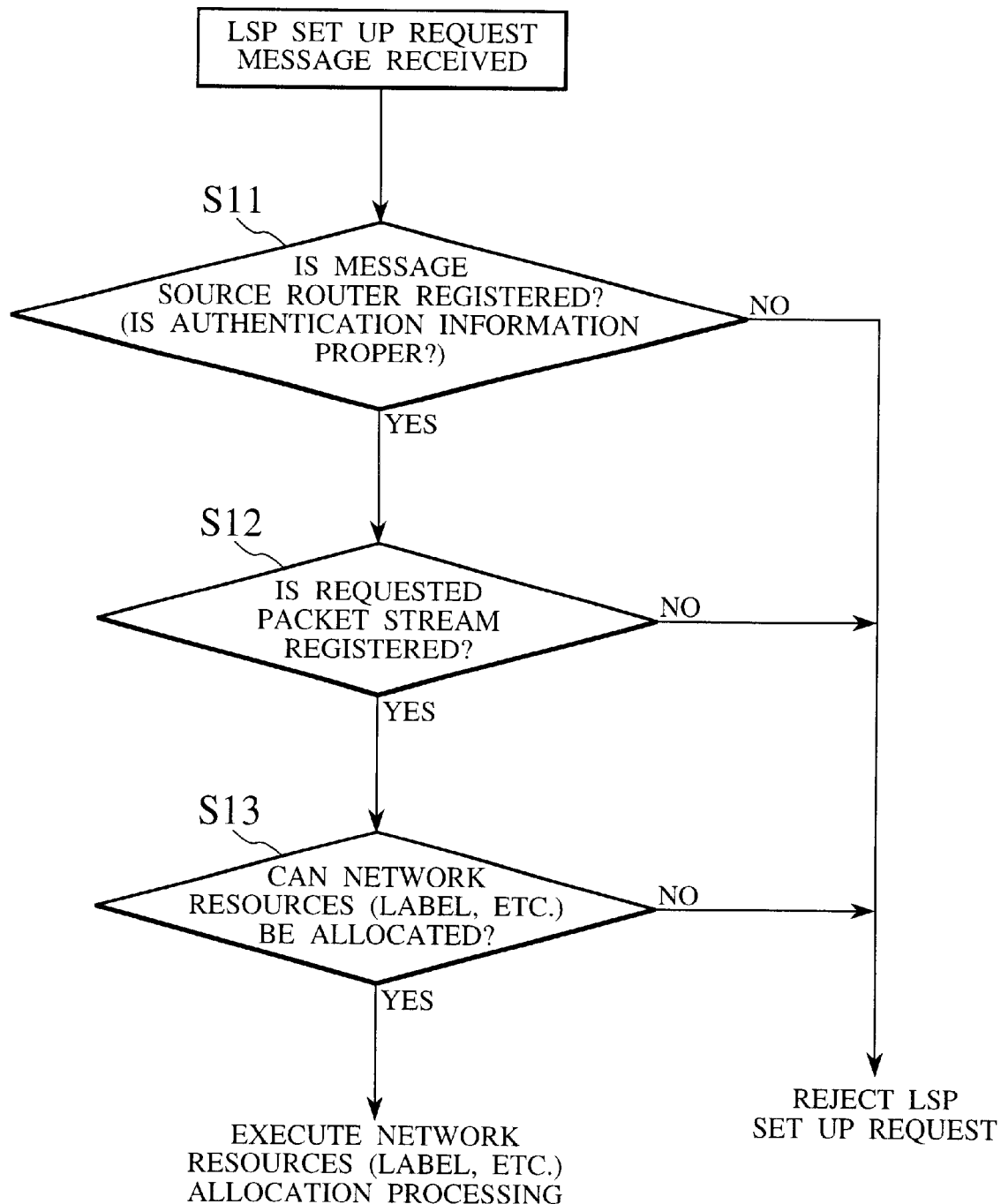
FIG. 6 is a flow chart for the operation of a label switch router device in a second exemplary case of a method for controlling label switching path set up according to the first embodiment of the present invention.

Similarly as in the first exemplary case, upon receiving the LSP set up request message, at the step S11 of FIG. 6, the policy management unit 4009 of the boundary router 1012 checks the message source information contained in the request message, and if it is confirmed that a node indicated by the message source information is already registered as the neighboring router in the policy table, the procedure for processing that LSP set up request is executed. Otherwise, the LSP set up request is rejected. The LSP set up request at this point may contain the authentication information, and this authentication information may be checked here at the boundary router 1012 as well, similarly as in the first exemplary case.

When it is judged that it is permitted to process the received LSP set up request message at the policy management unit 4009 as a result of the above described check of the message source information, next at the step S12 of FIG. 6, the boundary router 1012 analyzes the packet stream information contained in the LSP set up request message and checks whether a packet stream indicated by the packet stream information is included among streams that can utilize the LSP as registered in the policy table or not. Note that the steps S11 and S12 may be carried out at once by the single policy table referring. When the requested stream is not included among the streams registered in the policy table, the request is rejected at this point.

When the requested stream is included among the registered streams, next at the step S13 of FIG. 6, whether it is possible to secure network resources such as label (and bandwidth if necessary) for that LSP or not is judged at the resource management unit 4010, so as to make a final judgement as to whether it is possible to accept this LSP set up request or not. When it is judged that it is possible to accept this LSP set up request, the subsequent procedure is similar to that described above for the first exemplary case.

Subsequently, each downstream side router such as router 1015 or 1016 may carry out exactly the same procedure for checking the message source information (and authentication information, etc.), checking whether the requested stream is registered or not, and checking the network resources as done by the boundary router 1012, with respect to the LSP set up request received from the upstream side neighboring router. When it is guaranteed that the received message is a message received from the neighboring router within the same segment, each downstream side router may omit the checking of the message source information. For example, when the interface through which the router 1015 received the message is connected to the router 1012 of the same segment by a point-to-point link, it is virtually impossible for the other router outside the segment to send the message to the router 1015 by pretending to be a router inside the segment, so that the authentication of the message source information at the router 1015 may be unnecessary. On the other hand, when the router 1015 is connected with the router 1012 through a switch or the like and the router 1015 can be directly connected with a router outside the segment through that switch, there is a possibility for a router outside the segment to send the message to the router 1015 by pretending to be the router 1012, so that it may be preferable to carry out the checking of the message source information at the router 1015 similarly as in the boundary router 1012.

In addition, when it is certain that it is a message received from the router within the same network segment and it is expected that the policy check has already been made at the upstream side (as in the case where the LSP set up request message indicates that the policy check for the stream has already been made by some upstream router within the same network segment and it was judged that it is possible to accept this request, for example), the policy check as to whether the requested stream is the registered stream or not may also be omitted.

When the boundary router 1012 that has rejected the LSP set up request for some packet stream for some reason receives a packet (without a label attached thereto) belonging to the rejected stream from the boundary router whose LSP set up request has been rejected, the received packet is either discarded (by refusing even the reception of the packet), or transferred toward the next hop router 1015 that is selected by carrying out the conventional network layer header processing (by carrying out the hop-by-hop transfer processing), or else transferred to an LSP that is set up with this boundary router 1012 as the starting point, by the packet transfer processing unit 4005 or the switch unit 4003.

When the boundary router 1012 receives a packet that belongs to a packet stream for which the LSP set up request is rejected because the non-registered communication quality class is requested, if there exists some LSP that satisfies the definition of that packet stream among the other LSPs (of low quality) that are set up with the boundary router 1012 as the starting point or from the boundary router 1021 with the boundary router 1012 as a relay point, it is also possible to transfer the received packet to that LSP by carrying out the network layer processing. Alternatively, it is also possible to adopt a scheme such that, when the non-registered communication quality class is requested, the boundary router 1012 sets the upstream side label in correspondence to the downstream side low quality label and transfers the received packet to another LSP that has the boundary router 1012 as a relay point, that satisfies the definition of that packet stream and that is different from the requested LSP, without carrying out the network layer processing to that packet.

The procedure substantially similar to the above described one is also carried out between the other two boundary routers 1013 and 1024.

Note that the policy table of FIG. 5 is given in an exemplary format for judging the LSP set up permit/reject for a packet stream according to where it comes from (its source), but it is equally possible to use a format for judging the LSP set up permit/reject for a packet stream according to where it is going (its destination), or according to a combination of where it comes from (its source) and where it is going (its destination).

<<Case of controlling an LSP set up permit/reject judgement depending on a stream information alone>>

Next, as a third exemplary case, the case in which the segment 1010 provides the transfer service using LSP limited to a specific packet stream from the segment 1020 similarly as in the second exemplary case, but which one of the two inter-connection points between the segments 1010 and 1020 should be passed is not specifically limited will be described.

Here, similarly as in the second exemplary case, the packet stream can be defined by either one or both of an information regarding a source of data packets (source host address, or source network address, or a set of source host address, a protocol and a port number, etc.) and an information regarding a destination of data packets (destination host address, or destination network address, or a set of a destination host address, a protocol and a port number, or an exit router of some routing domain, etc.).

First, similarly as in the second exemplary case, the neighbor recognition procedure as neighboring nodes for carrying out the control for LSP set up, release, etc. is executed between the boundary router 1012 of the segment 1010 and the boundary router 1021 of the segment 1020 as well as between the boundary router 1013 of the segment 1010 and the boundary router 1024 of the segment 1020. Also, similarly as in the second exemplary case, a policy regarding for which packet stream the LSP set up should be requested (or the LSP set up should be permitted) is determined by the off-line contract or the like, and the determined content is registered in the policy table at least within the boundary routers 1012 and 1013. Here, unlike the second exemplary case, no deliberate stream distribution or route limitation is to be realized by the boundary routers in this case, so that the same information regarding the packet stream to be permitted can be set up at both of these boundary routers, and the policy table to be used in this third exemplary case may be formed by a field for the stream information alone.

Next, the operation in the case where the boundary router 1021 of the segment 1020 transmits an LSP set up request message to the boundary router 1012 of the segment 1010 for the sake of a specific packet stream to be transferred from the segment 1020 toward a direction of the segment 1010 will be described with reference to FIG. 7.

Figure 7:
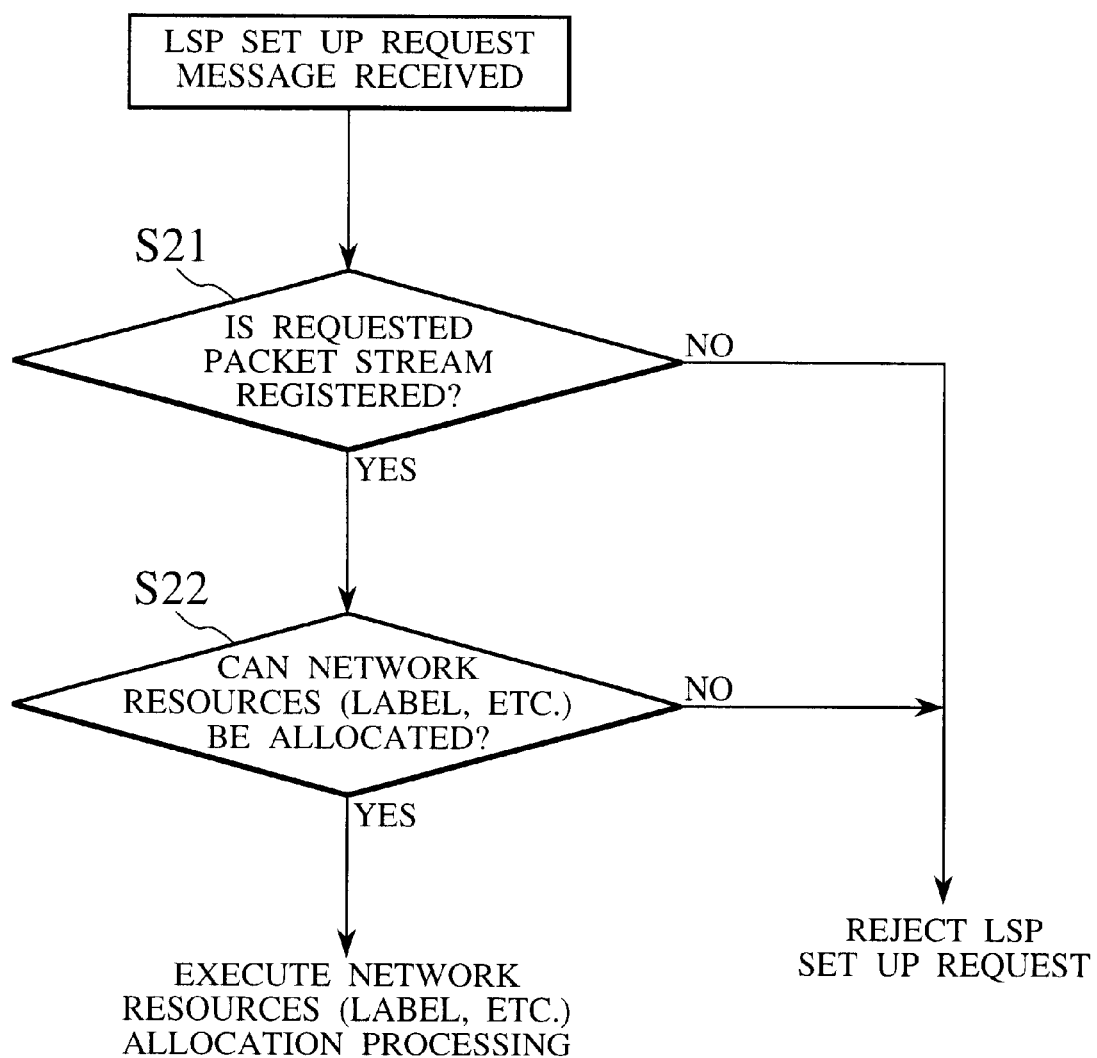
FIG. 7 is a flow chart for the operation of a label switch router device in a third exemplary case of a method for controlling label switching path set up according to the first embodiment of the present invention.

In this case, the check of the neighboring router as done in the first and second exemplary cases is not to be carried out, so that upon receiving the LSP set up request message, at the step S21 of FIG. 7, the boundary router 1012 analyzes the packet stream information contained in the LSP set up request message at the policy management unit 4009 and checks whether a packet stream indicated by the packet stream information is included among streams that are registered in the policy table in advance by the contract or the neighbor recognition procedure or not.

When the requested stream is included among the registered streams, next at the step S22 of FIG. 7, whether it is possible to secure network resources such as label (and bandwidth if necessary) for that LSP or not is judged at the resource management unit 4010, so as to make a final judgement as to whether it is possible to accept this LSP set up request or not. When it is judged that it is possible to accept this LSP set up request, the subsequent procedure is similar to that described above for the first exemplary case.

Subsequently, each downstream side router such as router 1015 or 1016 may carry out exactly the same procedure for checking whether the requested stream is registered or not, and checking the network resources as done by the boundary router 1012, with respect to the LSP set up request received from the upstream side neighboring router. When it is certain that it is a message received from the router within the same network segment and it is expected that the policy check has already been made at the upstream side (as in the case where the LSP set up request message indicates that the policy check for the stream has already been made by some upstream router within the same network segment and it was judged that it is possible to accept this request, for example), the policy check as to whether the requested stream is the registered stream or not may also be omitted.

At a time of making the contract or the registration regarding the stream information for a stream to which the LSP is to be provided, it is also possible to additionally register an auxiliary information as to whether only the best effort LSP is to be provided for each stream or the LSP for realizing a prescribed communication quality class or a specific communication quality value is also to be provided. In such a case, the exchange and negotiation of auxiliary information regarding the communication quality class for each stream information may also be carried out in the neighbor recognition procedure or the subsequent procedure for establishing a session for control messages described above. Also, in the LSP set up request acceptance permit/reject judgement, at a time of checking whether it is the registered stream or not, whether the communication quality class is not violating the registered one or not is also checked according to the policy table, and the check of the actual network resources is carried out when the communication quality class is permitted.

When the boundary router 1012 that has rejected the LSP set up request for some packet stream for some reason receives a packet belonging to the rejected stream from the boundary router whose LSP set up request has been rejected, the procedure similar to that of the second exemplary case will be carried out.

The procedure substantially similar to the above described one is also carried out between the other two boundary routers 1013 and 1024.

Note that the first to third exemplary cases described above have been directed to a case in which the LSP set up request is made from the upstream side toward the downstream side of the stream and the response regarding the LSP set up permit/reject is returned from the downstream side toward the upstream side, but the same mechanism is also applicable to a case in which the LSP set up request is made from the downstream side toward the upstream side of the stream and the response regarding the LSP set up permit/reject is returned from the upstream side toward the downstream side.

<<Case of controlling an LSP set up permit/reject judgement depending on a starting point information>>

Next, as a fourth exemplary case, the case in which the LSP set up request contains an information regarding a starting node (router or host) which initiates the LSP set up request, and the LSP set up request permit/reject judgement is controlled according to that starting point information will be described.

For example, the case in which the segment 1030 permits only the set up of LSP that has the boundary router 1021 within the segment 1020 as the starting point and rejects the set up of any other LSPs from external segments as far as the LSPs from external segments are concerned will be considered. In addition, a stream to be conveyed by that LSP can be limited to any of: (1) a stream of packets which have the specific host address or network address as the data packet source address, (2) a stream of packets of the specific application (specified by the protocol number and/or the port number) without limiting the data packet source address, (3) a stream satisfying a combination of (1) and (2) above (a stream of packets of the specific application from the specific source), and (4) any stream (not limited to any specific stream). Note that when the LSP is set up, the starting node carries out the operation to actually transmit data packets to the LSP for that stream, so that if the starting node is trustworthy (the registered starting node for which the authentication was successful), the system can be operated under the assumption that the stream as described in the LSP set up request message will actually flow through that LSP.

FIG. 8 shows one exemplary format of the policy table in the boundary router 1031 of the segment 1030 that carries out the LSP set up permit/reject judgement according to the starting point information. FIG. 8 shows an exemplary case in which the router 1021 is registered as a starting point router for which the LSP set up request is to be accepted, but no limitation is placed on the auxiliary information such as an information regarding a stream that flows through that LSP and a CoS requested by that LSP.

For this case, the operation in which the boundary router 1014 of the segment 1010 transmits an LSP set up request message to the boundary router 1031 of the segment 1030 to be transferred from the segment 1010 toward a direction of the segment 1030 will be described with reference to FIG. 9.

Figure 9:
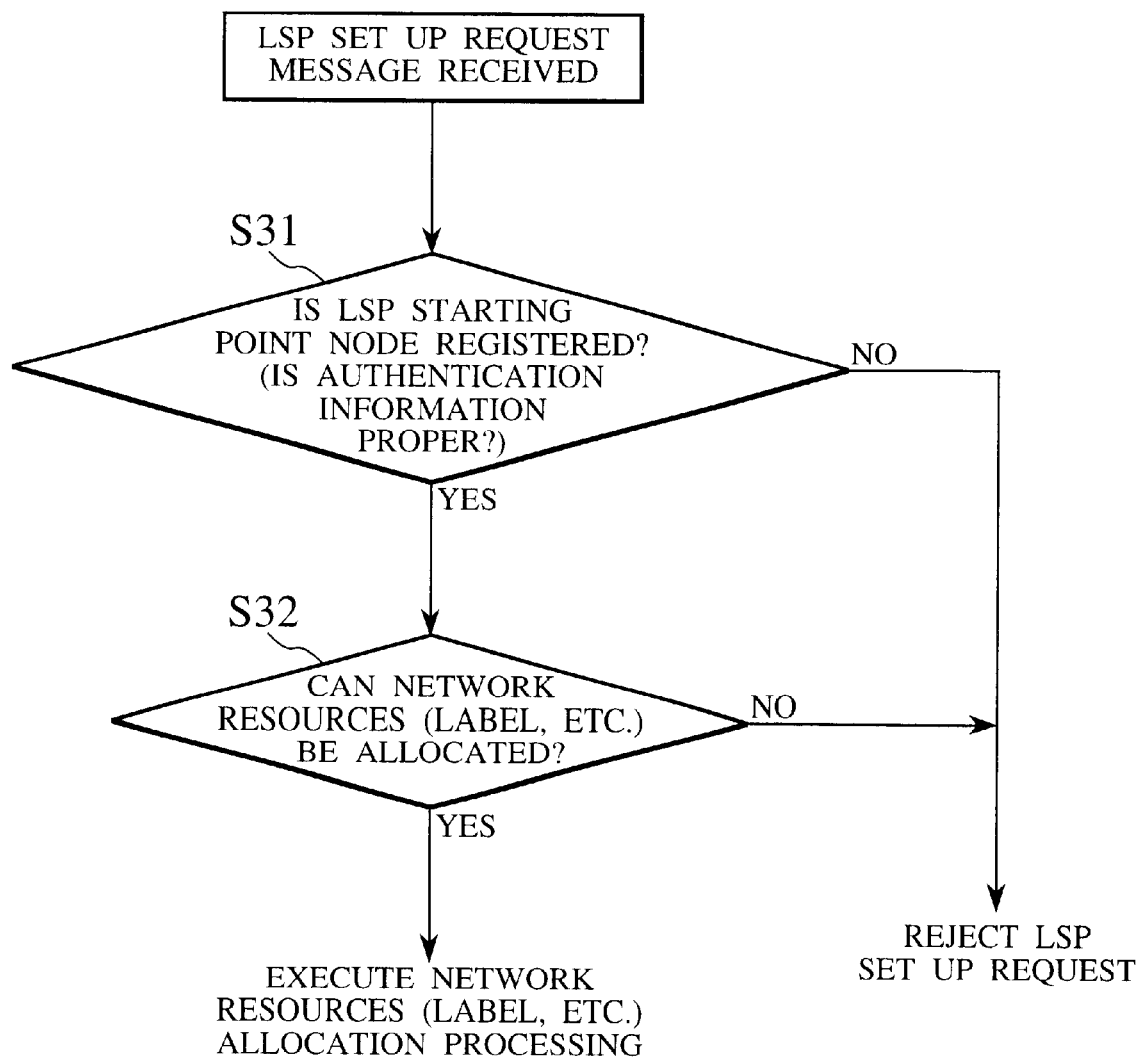
FIG. 9 is a flow chart for the operation of a label switch router device in the fourth exemplary case using the policy table of FIG. 8.

Upon receiving the LSP set up request message from the router 1014, at the step S31 of FIG. 9, the boundary router 1031 judges that the LSP set up is permissible in view of policy (in view of security) regardless of the stream information contained in the message when it is recognized that the LSP starting point node information contained in the message is registered in the policy table. Here, the LSP starting point node information may also contain the authentication information for the purpose of judging whether this information is a reliable one or not such that the LSP set up is rejected when the authentication fails. Also, in the case of judging the LSP set up permit/reject according to the stream information as well, it is possible to adopt a scheme in which the judgement as to whether the LSP set up is permissible or not according to whether the stream information contained in the LSP set up request message is registered in the policy table or not takes place only when the authentication is successful.

Then, for the LSP set up request that is accepted in view of policy, at the step S32 of FIG. 9, whether the actual network resources such as label (and bandwidth if necessary) can be allocated or not is further judged so as to make a final judgement as to whether to accept the LSP set up request or not.

When it is judged that the LSP set up request is acceptable at the boundary router 1031, a message indicating the response is returned to the router 1014 from the boundary router 1031 if that LSP is to be terminated at the boundary router 1031, or the LSP set up request message is transmitted to a next hop router 1034 from the boundary router 1031 if that LSP is to be extended further. The router 1034 may carry out the same policy check as done by the boundary router 1031, or may not carry out the policy check by judging that there is no need to carry out the policy check for the LSP set up request received from the boundary router 1031 of the same segment 1030. The fact that the policy check was carried out at the boundary router 1031 may be explicitly indicated in the LSP set up request message.

FIG. 10 shows another exemplary format of the policy table in the boundary router 1031 of the segment 1030 that carries out the LSP set up permit/reject judgement according to the starting point information. FIG. 10 shows an exemplary case in which the router 1021 is registered as a starting point router for which the LSP set up request is to be accepted, and a source network address of the packet is specified as an information regarding a stream that flows through that LSP (where it is assumed that no specification regarding a CoS is given here).

For this case, the operation in which the boundary router 1014 of the segment 1010 transmits an LSP set up request message to the boundary router 1031 of the segment 1030 to be transferred from the segment 1010 toward a direction of the segment 1030 will be described with reference to FIG. 11.

Figure 11:
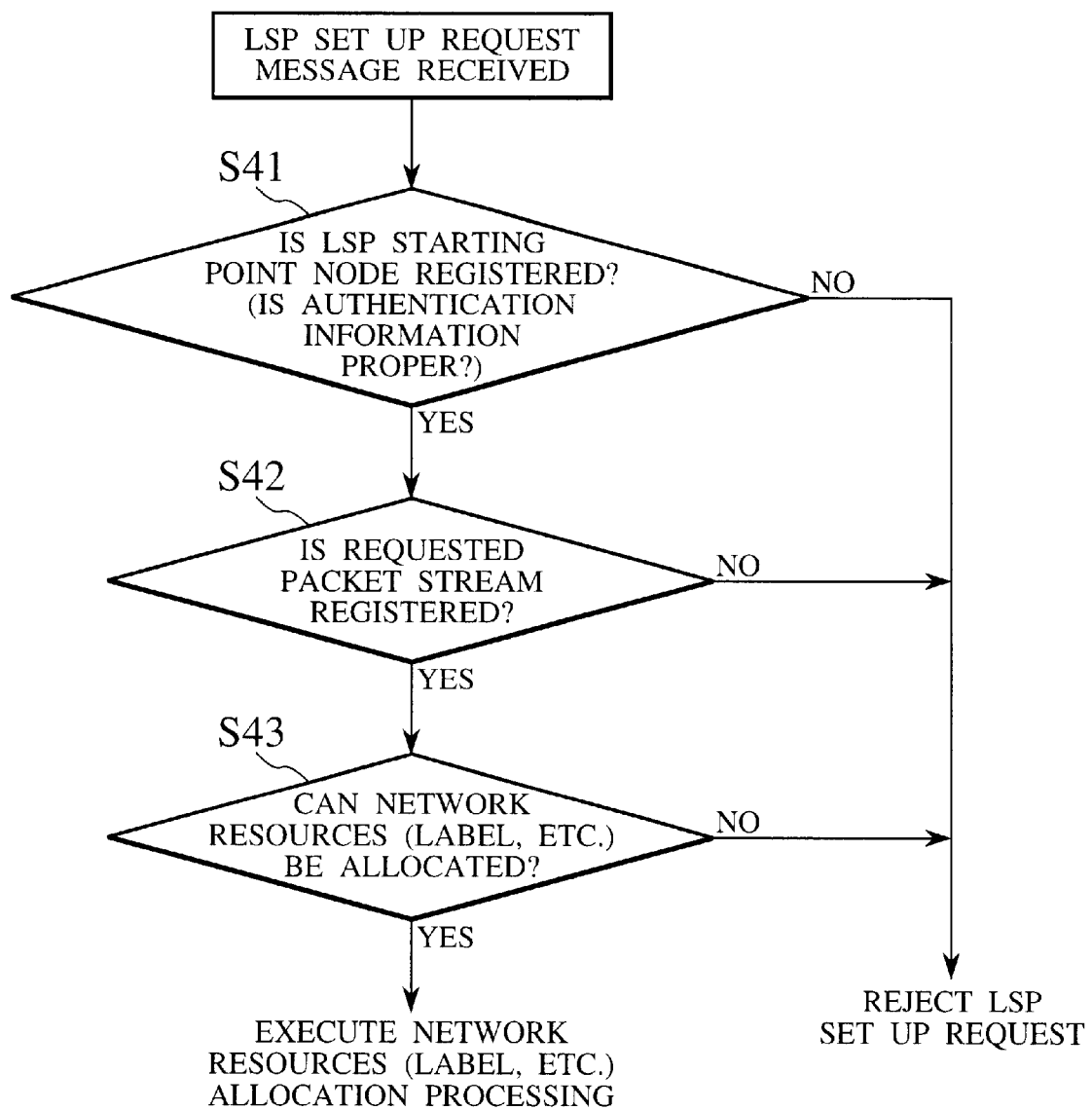
FIG. 11 is a flow chart for the operation of a label switch router device in the fourth exemplary case using the policy table of FIG. 10.

Upon receiving the LSP set up request message from the router 1014, at the steps S41 and S42 of FIG. 11, the boundary router 1031 judges that the LSP set up is permissible in view of policy (in view of security) when it is recognized that the LSP starting point node information and the stream information (the packet source network address in this example) contained in the message are registered in the policy table.

Then, for the LSP set up request that is accepted in view of policy, at the step S43 of FIG. 11, whether the actual network resources such as label (and bandwidth if necessary) can be allocated or not is further judged so as to make a final judgement as to whether to accept the LSP set up request or not.

When it is judge that the LSP set up request is acceptable at the boundary router 1031, a message indicating the response is returned to the router 1014 from the boundary router 1031 if that LSP is to be terminated at the boundary router 1031, or the LSP set up request message is transmitted to a next hop router 1034 from the boundary router 1031 if that LSP is to be extended further. The router 1034 may carry out the same policy check as done by the boundary router 1031, or may not carry out the policy check by judging that there is no need to carry out the policy check for the LSP set up request received from the boundary router 1031 of the same segment 1030. The fact that the policy check was carried out at the boundary router 1031 may be explicitly indicated in the LSP set up request message such that the router 1034 and the like that receives this message can omit the policy check upon recognizing by interpreting this message that the policy check has been already made by the boundary router of the segment to which it belongs.

Besides those described above, it is also possible to consider the case where the port number or the like that corresponds to the application is also registered in the policy table or the source address information and the port number are also registered in the policy table, as the stream information. In addition, the CoS information regarding CoS that can be provided by that LSP may also be registered. Even in these cases, the LSP set up request permit/reject judgement in view of policy is made at the boundary router 1031 by comparing the stream information contained in the LSP set up request received from the router 1014 with the information registered in the policy table.

Here, the exemplary case of making the LSP set up request permit/reject judgement according to the information regarding the source of the stream has been described, under the assumption that the boundary router 1031 protects the nodes within the segment 1030 from the streams flowing into the segment 1030 from the external, for example, but it is also possible to make the LSP set up request permit/reject judgement according to the information regarding the destination of the stream in order for the boundary router 1033 to control the streams flowing out to the external from the segment 1030, for example. It is also possible to make the LSP set up request permit/reject judgement according to the combination of the information regarding the source of the stream and the information regarding the destination of the stream.

The starting point node information in the LSP set up request message may contain the accompanying authentication information as already mentioned above, but when the starting point node information is not accompanied by the authentication information, whether the router that received the LSP set up request message trusts the starting point node information and the auxiliary information such as that of the stream contained in that message or not may be different depending on the routers or segments. When there is no accompanying authentication information, the following variations are available, for example: (1) the LSP set up request is rejected even when the registered starting point node is described in the message, (2) the LSP set up request is accepted only when the registered starting point node is described in the message but it does not matter if a stream other than that described in the LSP setup request message is actually transmitted from that LSP.

Note that the starting point node information may be explicitly described within the LSP set up request message, or may be obtained from the packet stream information (such as the source network address, for example) that is contained in the LSP set up request message.

When the boundary router 1012 receives a packet that belongs to a packet stream for which the LSP set up request is rejected because the non-registered communication quality class is requested, if there exists some LSP that satisfies the definition of that packet stream among the other LSPs (of low quality) that are set up with the boundary router 1012 as the starting point or from the boundary router 1021 with the boundary router 1012 as a relay point, it is also possible to transfer the received packet to that LSP by carrying out the network layer processing. Alternatively, it is also possible to adopt a scheme such that, when the non-registered communication quality class is requested, the boundary router 1012 sets the upstream side label in correspondence to the downstream side low quality label and transfers the received packet to another LSP that has the boundary router 1012 as a relay point, that satisfies the definition of that packet stream and that is different from the requested LSP, without carrying out the network layer processing to that packet.

Note also that this fourth exemplary case can be used in combination with the LSP set up permit/reject judgement according to the neighboring node information and/or the packet stream information, in substantially the similar manners as described above for the first to third exemplary cases, including all the possible variations mentioned above, or in combination with the LSP set up permit/reject judgement according to the ending point node information as described below for the next fifth exemplary case.

<<Case of controlling an LSP set up permit/reject judgement depending on an ending point information>>

Next, as a fifth exemplary case, the case in which the LSP set up request contains an information regarding an ending node (router or host) at which the LSP is to be terminated, and the LSP set up request permit/reject judgement is controlled according to that ending point information will be described.

For example, the case in which the boundary router 1031 of the segment 1030 permits only the set up of LSP that has the boundary router 1031 itself as the ending point and rejects the set up of any other LSPs up to the nodes 1034, 1032 or 1033 that is located further inside the segment 1030 as far as the LSP set up requests from external segment 1010 are concerned will be considered. This is the case where it is desired for the boundary router 1031 to carry out the usual header check for every packet, for example.

For this case, the operation in which the boundary router 1014 of the segment 1010 transmits an LSP set up request message to the boundary router 1031 of the segment 1030 to be transferred from the segment 1010 toward a direction of the segment 1030 will be described with reference to FIG. 12.

Figure 12:
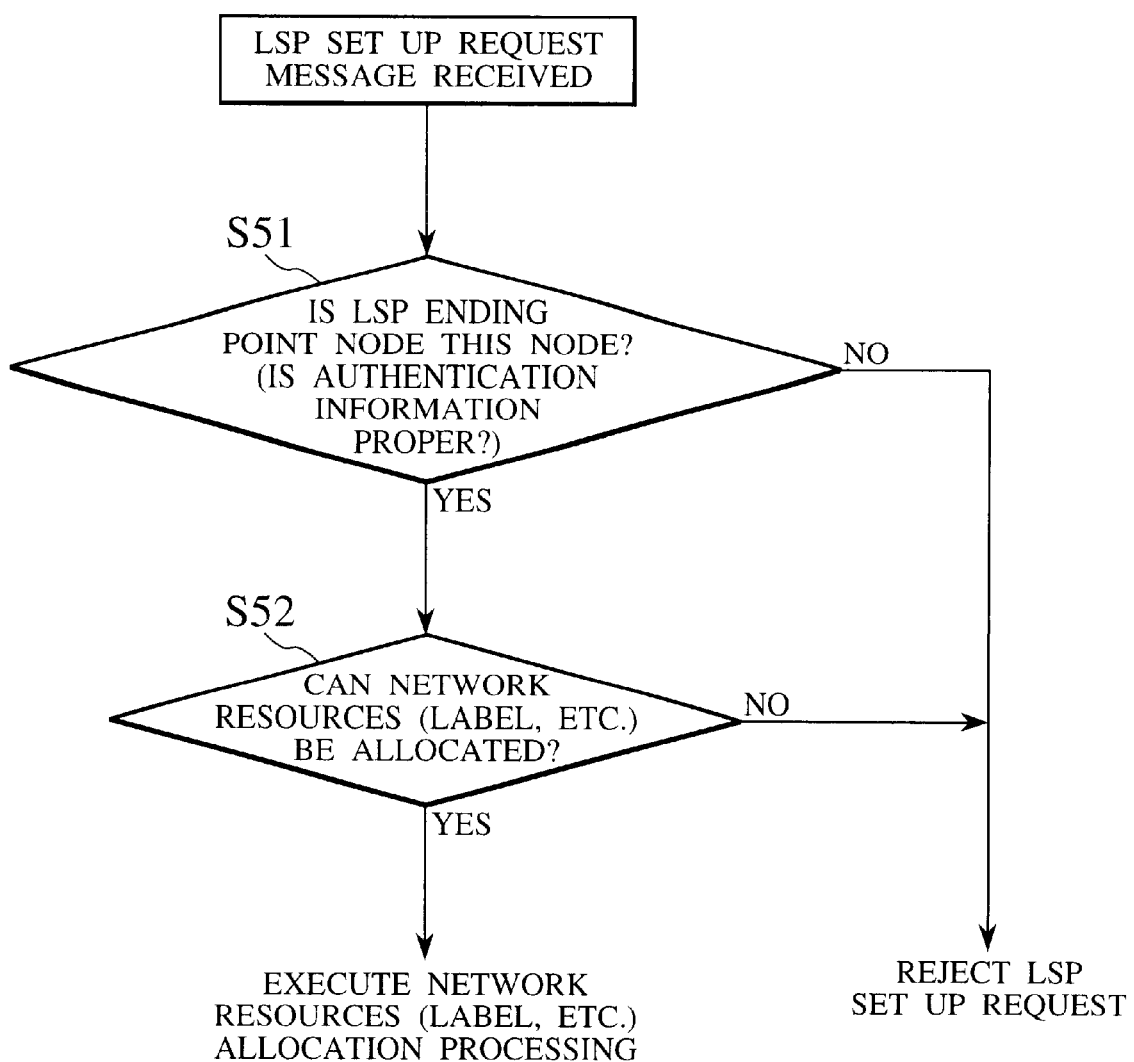
FIG. 12 is a flow chart for the operation of a label switch router device in a fifth exemplary case of a method for controlling label switching path set up according to the first embodiment of the present invention.

Upon receiving the LSP set up request message from the router 1014 of the segment 1010, at the step S51 of FIG. 12, the boundary router 1031 judges that the LSP set up is permissible in view of policy (in view of security) when it is recognized that the LSP ending point node information contained in the message indicates that the ending point node is the boundary router 1031 itself.

Then, for the LSP set up request that is accepted in view of policy, at the step S52 of FIG. 12, whether the actual network resources such as label (and bandwidth if necessary) can be allocated or not is further judged so as to make a final judgement as to whether to accept the LSP set up request or not.

When the LSP set up request specifies a node that is within the same segment 1030 and located beyond the boundary router 1031 on the route as an ending point, either a message indicating the rejection of the LSP set up request is returned to the router 1014 or the LSP is terminated at this boundary router 1031 and a message indicating the set up permission is returned to the router 1014. Here, the ending point node information may be explicitly described within the LSP set up request message, or may be obtained from the packet stream information (such as the destination network address, for example) that is contained in the LSP set up request message.

As another example of making the LSP set up permit/reject judgement according to the ending point node information, there is a case where the boundary router 1031 permits the set up of LSP that terminates within its own segment 1030, but rejects the set up of LSP that terminates outside its own segment 1030 (the set up of LSP that extends to the other segment using the segment 1030 as a relay point). In this case, the boundary router 1031 maintains a list of ending point node information for ending point nodes for which the LSP set up is to be permitted in the policy table, and upon receiving the LSP set up request message, the boundary router 1031 carries out the processing for permitting the LSP set up if the ending point indicated in the LSP set up request message is the registered ending point node.

Note here that this fifth exemplary case can be used in combination with the LSP set up permit/reject judgement according to the neighboring node information, the packet stream information, and/or the starting point node information, in substantially the similar manners as described above for the first to fourth exemplary cases, including all the possible variations mentioned above.

Note also that the examples described above are directed to cases where the LSP set up permit/reject judgement based on the neighbor, starting point, ending point, etc., according to an information of each node (an IP address, for example), but it is also possible to realize the LSP set up permit/reject judgement according to a network or a segment to which each node belongs (using an IP address prefix or an information regarding a correspondence between nodes and segments, for example).

As described, according to this first embodiment, it becomes possible to realize the LSP set up limited only to a specific neighboring node, the LSP set up limited only to a specific packet stream, the LSP set up limited only to a specific starting point node, or the LSP set up limited only to a specific ending point node, and it becomes possible to utilize the label switching without causing any problem from a viewpoint of the security or the network resource utilization, compared with the conventional case of not utilizing the label switching.

Referring now to FIG. 13 to FIG. 18, the second embodiment of a node device and a method for controlling label switching path set up according to the present invention will be described in detail.

This second embodiment is directed to the application of the node device and the label switching path set up control method of the present invention as described in the first embodiment above to a concrete case of a backbone network system for an apartment.

Figure 13:
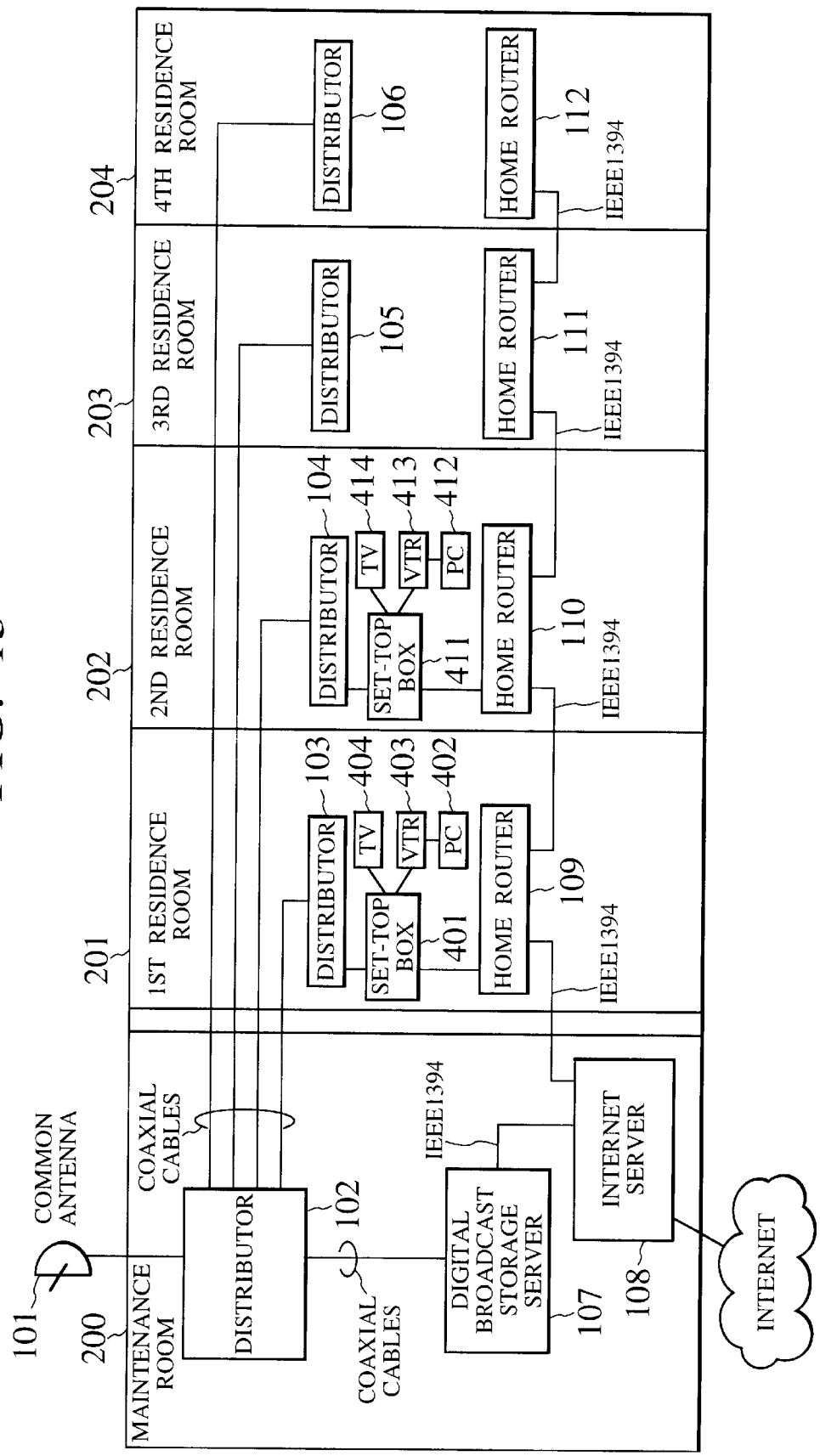
FIG. 13 is a schematic block diagram showing a backbone network system using a router device and a method for controlling label switching path set up according to the second embodiment of the present invention.

FIG. 13 shows an exemplary configuration of a backbone network system for an apartment according to this second embodiment. Here, it is assumed that the apartment comprises four residence rooms 201 to 204 and a maintenance room 200.

This apartment is equipped with a common antenna 101 for receiving digital satellite broadcast, and broadcast signals received by this common antenna 101 are distributed to four residence rooms 201 to 204 through coaxial cables, via a distributor 102 provided at the maintenance room 200, for example. The coaxial cables lead to the residence rooms 201 to 204 are terminated at distributors 103 to 106 provided at the residence rooms 201 to 204, respectively. In each residence room, the distributor is connected with various home electric devices such as TV, set-top box, digital VTR, etc. For example, as shown in FIG. 13, the distributor 103 of the first residence room 201 is connected with a set-top box 401 to which a TV 404 and a digital VTR 403 are further connected, and the distributor 104 of the second residence room 202 is connected with a set-top box 411 to which a TV 414 and a digital VTR 413 are further connected, and so on. Moreover, a PC 402 is connected to the digital VTR 403 in the first residence room 201 and a PC 412 is connected to the digital VTR 403 in the second residence room 202 in this example.

The distributor 102 is also connected to a digital broadcast storage server 107 provided in the maintenance room 200 through a coaxial cable. The digital broadcast storage server 107 functions to store prescribed programs from the received broadcast, and delivers appropriate data in response to a request from a terminal in each residence room. The digital broadcast storage server 107 is also connected to an Internet server 108 provided in the maintenance room 200. The Internet server 108 provides functions of a proxy server and NAT (Network Address Translation) at a time of making access to the Internet.

In addition, this apartment is equipped with a backbone network formed by IEEE 1394 buses, which connect home routers 109 to 112 provided at the residence rooms 201 to 204, respectively, with the Internet server 108. Each home router connects this backbone network with a home network of each residence room. Thus the IEEE 1394 buses can be effectively regarded as a network for 1394 nodes in forms of the digital broadcast storage server 107, the Internet server 108, and the home routers 109 to 112.

Note that each home network may have a home backbone network formed by IEEE 1394 buses, which is set in router connection with the apartment backbone network through the home router. In such a case, the home backbone network and the apartment backbone network can be regarded as separate sub-nets from a viewpoint of the Internet. Namely, both the apartment backbone network and the home backbone network are formed by IEEE 1394 buses but they may be given separate IP sub-net addresses so that the routing processing is carried out separately in each backbone network as a separate IP sub-net. In the case of video transfer, it is also possible to exchange data between these backbone networks without carrying out the IP layer processing.

Figure 14:
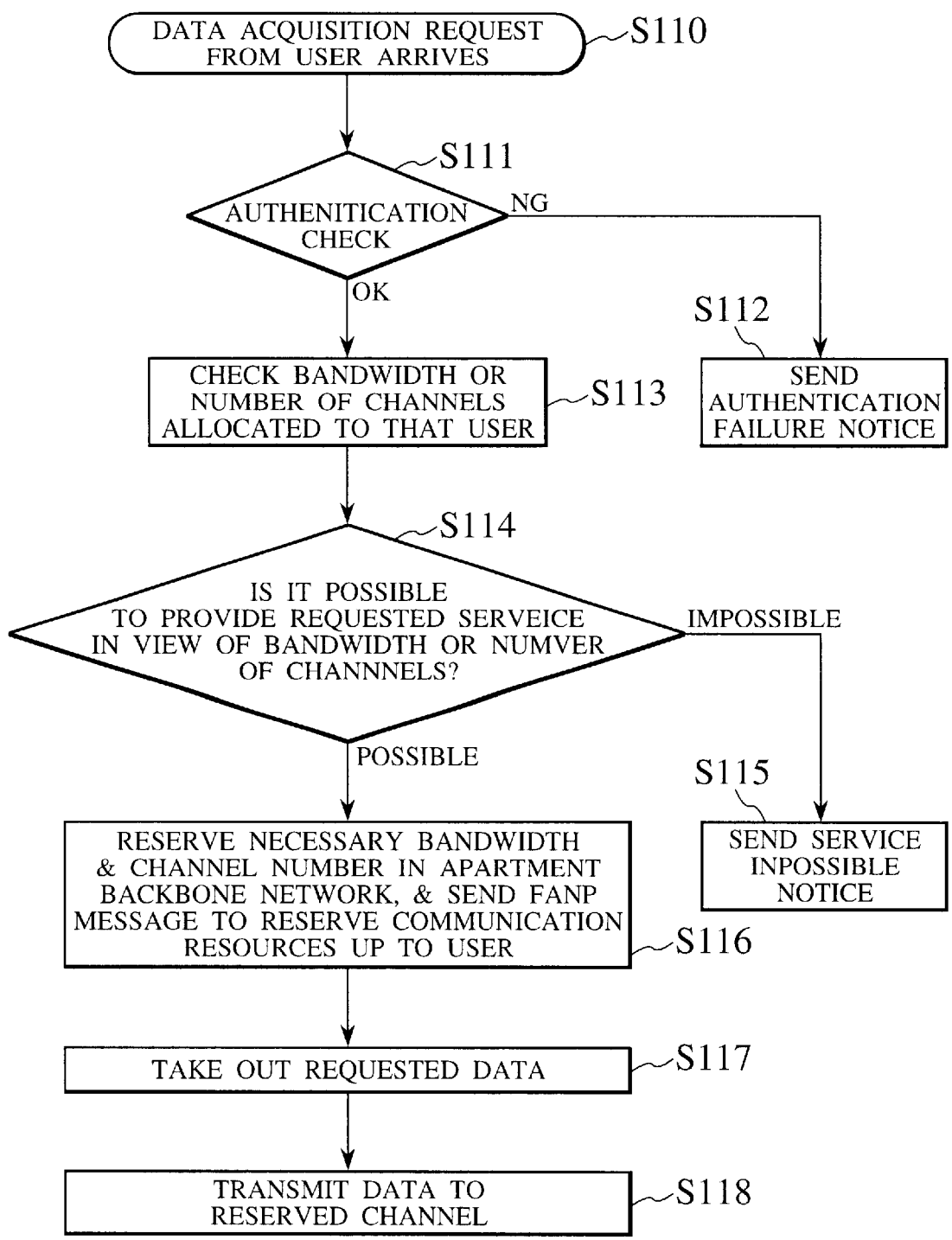
FIG. 14 is a flow chart for the operation of a digital broadcast storage server in the backbone network system of FIG. 13 for one exemplary case.

Now, the operation of the digital broadcast storage server 107 since a data acquisition request indicating a program that a user wishes to watch arrives from a user until the corresponding data are transmitted will be described with reference to FIG. 14.

First, the data acquisition request arrives from a user (step S110). This request arrives in a form of an IP packet, and a user who issued this data acquisition request is recognized from a combination of address and port number. Here, it is assumed that a specific port number is assigned in advance to a program for analyzing the data acquisition request.

Then, the authentication check for checking whether this user is a user who is permitted to use this digital broadcast storage server 107 or not is carried out (step S111). When the authentication fails, an authentication failure notice is returned to the user (step S112), whereas when the authentication succeeds, the operation proceeds to the preparation for starting the requested service.

Here, an exemplary policy adopted by the digital broadcast storage server 107 can be as follows. In the digital broadcast storage server 107 of this embodiment, an upper limit is provided for the bandwidth or the number of channel numbers that can be used by each subscribed residence room because the bandwidth and the isochronous channel numbers of the apartment backbone network are limited. For example, the digital broadcast storage server 107 has a table indicating a limitation for each residence room such as "for the first residence room 201, the simultaneously watchable number of channels is up to 3 and the total delivery bandwidth is up to 18 Mbps", and follows the policy that "the requested service is provided if the amount of resources such as the apartment backbone network that is going to be consumed by one residence room when the requested service is provided is lower than a value specified in this table".

Thus, the bandwidth or the number of channels allocated to the user who made the data acquisition request is checked (step S113), and whether it is possible to provide the requested service or not is judged in view of the available bandwidth or number of channels (step S114). If it is impossible, a service impossible notice is sent to the user (step S115). Here, the service impossible notice may be attached with an information indicating the reason (that the number of channels exceeds the prescribed one, for example), and also with an information for urging the user to check the upper limit.

In order to realize such a service quickly, the digital broadcast storage server 107 may permanently plays a role of the isochronous resource manager for the 1394 buses. To this end, it is possible to set a preference value of the isochronous resource manager to a large value. In this case, the quick processing becomes possible as it becomes possible to refer to a resource table (a table for remaining bandwidth and remaining isochronous channel numbers) of the isochronous resource manager which is provided in the digital broadcast storage server 107 itself.

When it is judged as possible to provide the service at the step S114, the communication resources (bandwidth, isochronous channel numbers) of the apartment backbone network are reserved by using IEC 1883 and the like, so as to reserve the communication resources for transmitting data from the digital broadcast storage server 107 to the user terminal through the apartment backbone network (step S116). Then, a FANP (Flow Attribute Notification Protocol) message is transmitted to (a direction of) the service requesting terminal (step S116). Here, the FANP is a protocol for notifying a destination (IP address) and a link layer identifier information (isochronous channel number in this example) for data to be transmitted subsequently, to a neighboring node. Using this FANP, the communication resources up to the receiving terminal are reserved from the digital broadcast storage server 107. Further details of FANP can be found in Japanese Patent Application No. 8-264496 (1996), for example.

Note that the FANP message transmitted here corresponds to the LSP set up request message of the first embodiment described above, while the link layer identifier corresponds to the label of the first embodiment described above and data (video data) to be transmitted by this operation corresponds to the packet stream of the first embodiment described above.

This FANP message contains the IP address of the node that issued the data acquisition request as a destination address, and an information such as the isochronous channel number of the apartment backbone network to be used in transmitting data from the digital broadcast storage server 107 and the attribute of data to be transmitted (that it is MPEG video, for example). It may further contain an information regarding the bandwidth to be used or an information regarding an address of the transmission node and the presence/absence of a request for end-to-end ACK message.

Here, the reservation of the communication resources may be carried out by using RSVP (Resource Reservation Setup Protocol) instead of FANP. RSVP is an IP level signaling protocol and further details of RSVP can be found in Japanese Patent Application 9-52125 (1997), for example.

It is also possible to use both FANP and RSVP. In such a case, the reservation of the communication resources up to the receiving terminal is carried out by using RSVP from the digital broadcast storage server 107, and FANP is used for notification of the datalink identifier to be used to a neighboring node.

Next, when the necessary communication resources are reserved and the preparation for transfer of data such as video data to the receiving terminal is completed, the transmission of data stored in the digital broadcast storage server 107 begins. Namely, the requested data are taken out (step S117), converted into a format suitable for data transfer on 1394, and then transmitted through the isochronous channel of the reserved isochronous channel number (step S118).

Next, the operation of the home router 109 for an exemplary case of accessing the digital broadcast storage server 107 from the PC 402 through the home router 109 will be described with references to FIG. 15 and FIG. 16.

First, the PC 402 makes an access to a home page provided by the digital broadcast storage server 107 so as to make an access to the digital broadcast storage server 107. Initially, the user carries out the recording channel setting in order to register a request such as "I want to request recording of this channel all the time" at the digital broadcast storage server 107. Here, it is assumed that this registration can be realized by appropriate writing or setting on the home page of the digital broadcast storage server 107. Then, the PC 402 transmits an IP packet destined to the digital broadcast storage server 107 in order to exchange information with the digital broadcast storage server 107 in HTTP (Hyper Text Transfer Protocol), and this packet is treated by a straightforward packet forwarding at the home router 109.

Here, if the home router is equipped with no security function, a free entrance into that residence room is allowed from a viewpoint of the apartment backbone network, which would pose serious problems regarding the privacy of home network and the threat from crackers. For this reason, the home router of this embodiment is provided with a firewall/authentication processing function on the apartment backbone network side, which ensures the security by carrying out the authentication processing or the firewall processing for every IP packet that enters from the apartment backbone network side.

Now, the HTTP packet (recording channel setting packet) that arrived at the digital broadcast storage server 107 is processed inside the digital broadcast storage server 107, and as a result, the recording of the requested digital broadcast channel is automatically carried out.

Next, the user makes an access to the home page of the digital broadcast storage server 107 through the PC 402 in order to watch the recorded program. Here, the user makes settings for the channel and the program to be watched on the display of the home page, and the setting of the desired program is made through RTSP (Real Time Streaming Protocol) or the like. The exchange of this packet (IP packet) between the PC 402 and the digital broadcast storage server 107 is realized similarly as in the case of HTTP (since RTSP is based on HTTP).

Here, the PC 402 may include some identification number (P) as a user information in the RTSP packet. Using this identification number, it becomes possible for the user side to check later a request RTSP packet to which this setting corresponds.

Upon receiving a request for program transmission by the data acquisition request, the digital broadcast storage server 107 carries out the user authentication and the reservation of the communication resources (bandwidth, isochronous channel) of the apartment backbone network using IEC 1883 or the like as described above, and transmits the FANP message described above toward the home router 109. Here, the reserved isochronous channel is assumed to be #x. This FANP message contains descriptions that the target terminal is the PC 402 (an IP address of the PC 402), that the data to be transferred is the MPEG video (not an IP packet, implying that it will be transmitted in the transmission format of MPEG-over-1394 as specified by IEC 1883), that the requested bandwidth is 6 Mbps, that it will be transmitted using the isochronous channel of the isochronous channel number #x reserved earlier by the digital broadcast storage server 107 up to the home router 109, etc.

Note that the FANP message may also contain the necessary authentication information. Also, the above described identification number (P) may be included in the FANP packet so as to make it possible for the target terminal (the PC 402 in this example) to recognize that this FANP packet corresponds to the control by the above described RTSP packet. It is assumed that the value of this identification number will be transmitted without being rewritten up to the target terminal.

Note also that the FANP message transmitted here corresponds to the LSP set up request message of the first embodiment described above, while the link layer identifier corresponds to the label of the first embodiment described above and data (video data) to be transmitted by this operation corresponds to the packet stream of the first embodiment described above.

Then, at the home router 109, the facts that the target is the PC 402, and that a network connected to the PC 402 is the home backbone network are recognized first. Then, the communication resources (bandwidth, isochronous channel (assumed to be #y here)) of the IEEE 1394 bus that constitutes the home backbone network are reserved. Then, a PCR (Plug Control Register) of the PC 402 is set up using IEC 1883, so as to make it possible for the PC 402 to receive data from the isochronous channel #y. Then, the FANP message is transmitted toward the PC 402.

This FANP message contains descriptions that the target terminal is the PC 402 (an IP address of the PC 402), that the data to be transferred is the MPEG video (not an IP packet, implying that it will be transmitted in the transmission format of MPEG-over-1394 as specified by IEC 1883), that the requested bandwidth is 6 Mbps, that it will be transmitted using the isochronous channel of the isochronous channel number #y reserved earlier by the home router 109 up to the PC 402, etc.

Note that the FANP message may also contain the necessary authentication information. Also, the above described identification number (P) may be included in the FANP packet so as to make it possible for the target terminal (the PC 402 in this example) to recognize that this FANP packet corresponds to the control by the above described RTSP packet.

At the same time, inside the home router 109, the setting of a 1394 switch provided therein is made by registering an information such as "isochronous channel signals entered through the isochronous channel number #x from the apartment backbone network side are transferred to the isochronous channel number #y of the home backbone network side, and transfer data is MPEG-over-1394", for example. For this purpose, the 1394 switch in the home router has a setting table as shown in FIG. 16.

Then, when the digital broadcast storage server 107 starts the MPEG video data transmission with respect to the isochronous channel of the isochronous channel number #x of the apartment backbone network, the data are transferred to the home backbone network via the home router 109. This datalink switching at the home router 109 corresponds to the label switching of the first embodiment described above.

Figure 17:
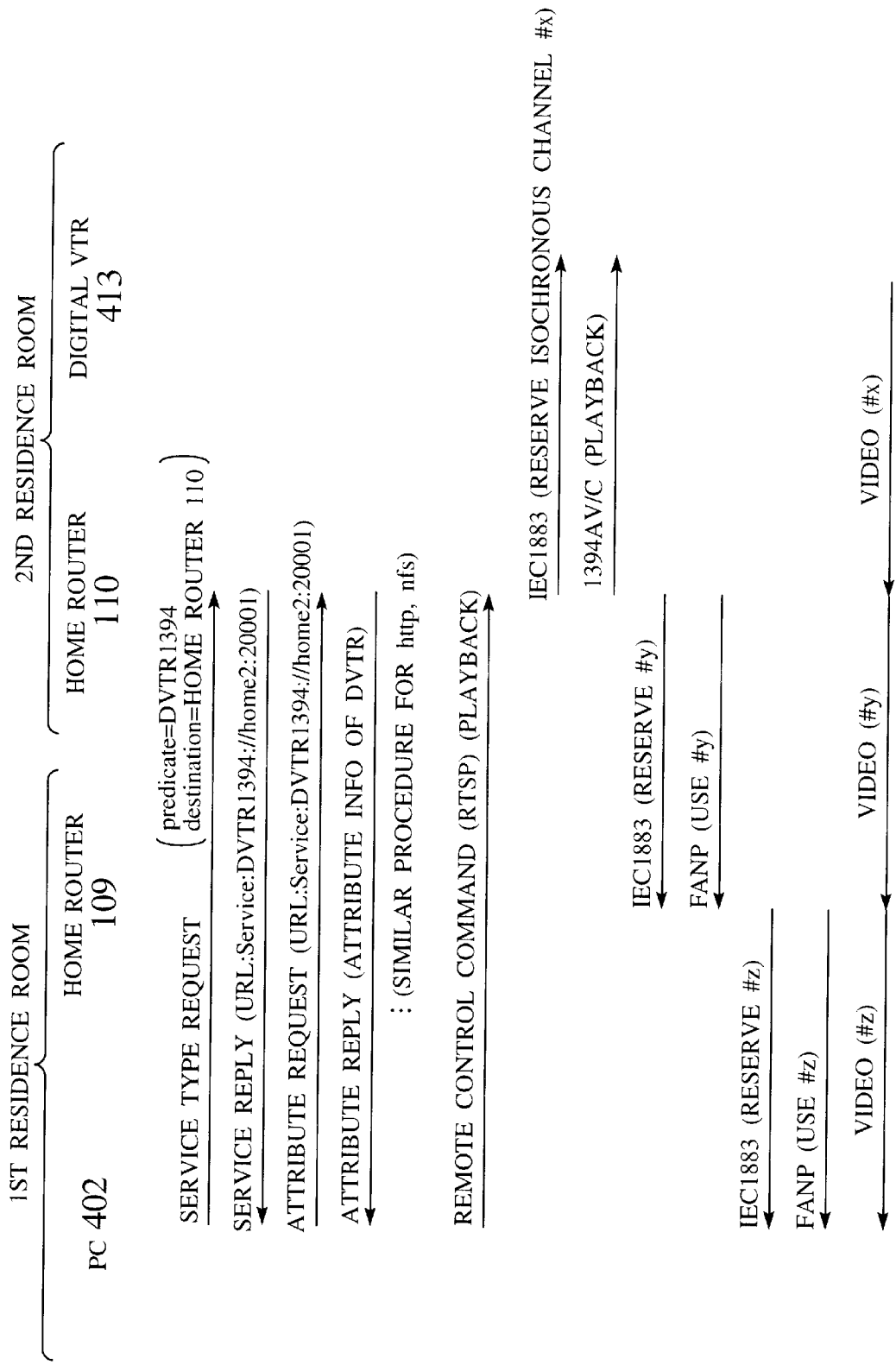
FIG. 17 is a sequence chart showing the operation in the backbone network system of FIG. 13 for another exemplary case.

Next, the operation in an exemplary case of watching video data recorded by the digital VTR 413 of the second residence room 202 at the PC 402 of the first residence room 201 by controlling the digital VTR 413 of the second residence room 202 from the PC 402 of the first residence room 201 will be described with references to FIG. 17 and FIG. 18.

First, the PC 402 of the first residence room 201 sends a service type request by making an access to the home router 110 of the second residence room 202. Here, GUI (Graphical User Interface) on the PC 402 can be a home page of the Web. The home router 110 of the second residence room 202 then makes a service type reply regarding the WWW server, the file server of the PC 412, and the digital VTR 413 of the second residence room 202. Then, the PC 402 of the first residence room 201 acquires the address information and the attribute information concerning the service or the device by making a service type request or an attribute request.

Next, the PC 402 of the first residence room 201 selects the digital VTR 413 of the second residence room 202 on the GUI, and issues a remote control command with respect to that terminal or service. More specifically, the PC 402 issues a playback command for a specific program using RTSP. Actually, this command reaches to a prescribed port of the home router 110 of the second residence room 202 which functions as a proxy server.

Then, the home router 110 of the second residence room 202 recognizes that this is a remote control request to the digital VTR 413 of the second residence room 202, and carries out the processing necessary for the remote control of the digital VTR 413 of the second residence room 202. First, the communication resources (bandwidth, isochronous channel number #x) of the home backbone network of the second residence room 202 are acquired so as to reserve the communication resources necessary for video transmission. Then, for that isochronous channel, using IEC 1883 for urging data transmission and the 1394 AV/C protocol defined for the digital VTR, the digital VTR 413 of the second residence room 202 is urged to carry out data transmission.

Either before or after that, the home router 110 of the second residence room 202 acquires the communication resources (bandwidth, isochronous channel #y) necessary for video transmission on the apartment backbone network, and using IEC 1883, urges the home router 109 of the first residence room 201 to carry out data reception.

At this point, the home router 110 of the second residence room 202 recognizes that the isochronous channel #x on the home backbone network of the second residence room 202 and the isochronous channel #y of the apartment backbone network are corresponding to each other, and carries out the setting of a table in its internal 1394 switch similarly as described above.

Then, The home router 110 of the second residence room 202 sends the FANP message described above to the home router 109 of the first residence room 201. This FANP message contains descriptions that the target terminal is the PC 402 of the first residence room 201 (an IP address of the PC 402), that the data to be transferred is the MPEG video (not an IP packet, implying that it will be transmitted in the transmission format of MPEG-over-1394 as specified by IEC 1883), that the requested bandwidth is 6 Mbps, that it will be transmitted using the isochronous channel of the isochronous channel number #x reserved earlier by the home router 110 of the second residence room 202 up to the home router 109 of the first residence room 201, etc.

Note that the FANP message may also contain the necessary authentication information. This authentication message may contain an information indicating that the source of this FANP packet is the home router 110 (or the user) of the second residence room 202, an information for proving that this FANP packet has not been altered, etc.

Note also that the FANP message transmitted here corresponds to the LSP set up request message of the first embodiment described above, while the link layer identifier corresponds to the label of the first embodiment described above and data (video data) to be transmitted by this operation corresponds to the packet stream of the first embodiment described above. Also, the information indicating that the source of this FANP packet is the home router 110 of the second residence room 202 corresponds to the LSP set up request message source information of the first embodiment described above, while the IP address of the target terminal corresponds to the stream information of the first embodiment described above.

Figure 15:
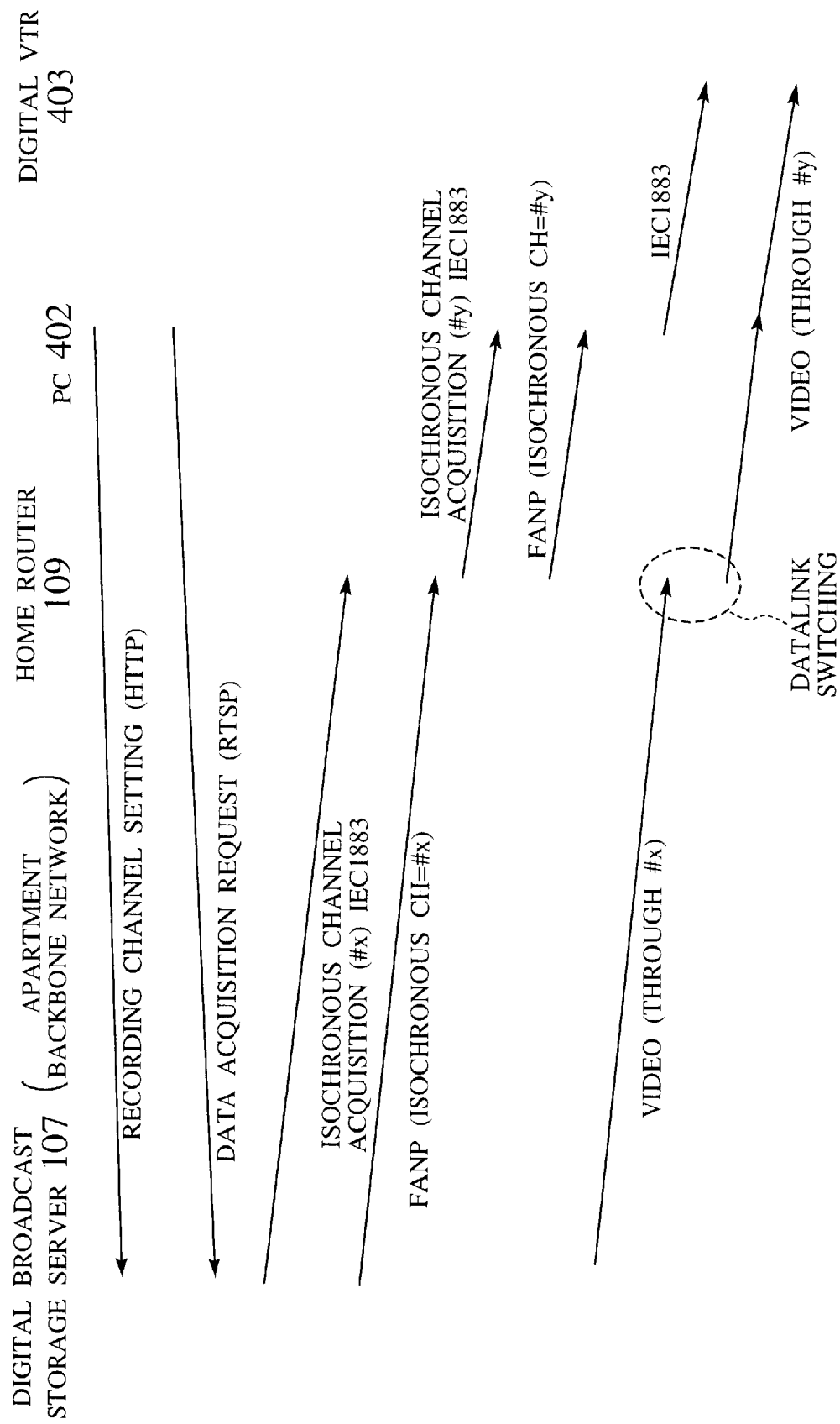
FIG. 15 is a sequence chart showing the operation of a home router in the backbone network system of FIG. 13 for one exemplary case.

The operation of the home router 109 of the first residence room 201 that received this FANP message is substantially the same as in the case of FIG. 15 described above. Namely, by referring to a policy table in the home router 109 of the first residence room 201, the home router 109 checks whether it is permitted for the home router 110 of the second residence room 202 to carry out the packet (frame) forwarding by referring only to the datalink layer identifier through a 1394 switch (that is, the label switching as described in the first embodiment) at the home router 109 of the first residence room 201 or not, and when it is permitted, the home router 109 permits the label switching for the packet. Here, the policy table is set up in a form shown in FIG. 18, for example, in a form of a list of users, terminals or home routers for which the label switching is to be permitted.

When the label switching is permitted, the home router 109 of the first residence room 201 reserves the isochronous channel #z in the home backbone network of the first residence room 201, recognizes that this isochronous channel #z and the isochronous channel #y on the apartment backbone network side are corresponding to each other, and carries out the setting of a table in its internal 1394 switch similarly as described above for the case of FIG. 15.

As a result, the video data from the digital VTR 413 of the second residence room 202 to the PC 402 of the first residence room 201 actually passes through the home backbone network of the second residence room 202, the 1394 switch of the home router 110 of the second residence room 202, the apartment backbone network, the 1394 switch of the home router 109 of the first residence room 201, and the home backbone network of the first residence room 201 and eventually reaches to the PC 402. Consequently, it becomes possible to watch the video from the digital VTR 413 of the second residence room 202 at the PC 402 of the first residence room 201.

In this case, because the data to be transferred are not necessarily IP packets and the authentication for the sake of using the 1394 switch can be supported by a region provided in the FANP packet, the packet filtering/firewall processing for each IP packet within the home router may be omitted. This is quite advantageous in the case of realizing a broadband communication such as video communication because the packet filtering exerts a heavy processing load in general.

Note that the second embodiment described above corresponds to a special case of the first embodiment described above in which the starting point node of the LSP and the source of the stream to be transmitted through the LSP are identical so that they are not explicitly distinguished.

It is to be noted that the various functions of the router device according to the present invention as described above can be realized by either hardware or software. In the case of software realization, it is also possible to implement the software in a computer readable recording medium storing programs for causing the computer to execute the procedures according to the LSP set up control method of the present invention, or to function as the router device of the present invention, or to realize the function of the router device of the present invention.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A router device, comprising:
   a switch unit for carrying out a label switching with respect to entered packets according to a correspondence between an input side label for identifying a channel from which a packet stream is to be entered and an output side label for identifying a channel from which the packet stream is to be outputted;
   a memory unit for storing a policy information indicating a permitted starting point of a label switching path for which a packet transfer by the label switching is to be permitted;
   a receiving unit for receiving a request message for requesting a set up of a requested label switching path through the router device, the request message containing a starting point information indicating a starting point node/network of the requested label switching path and a stream information indicating a desired packet stream to be transferred through the requested label switching path; and
   a control unit for judging whether or not to permit the set up of the requested label switching path by comparing the starting point information contained in the request message as received by the receiving unit with the policy information as stored in the memory unit, and setting up the requested label switching path through the router device for the desired packet stream indicated by the stream information contained in the request message as received by the receiving unit when the set up of the requested label switching path is judged as permitted.

2. The router device of claim 1, wherein the control unit judges the set up of the requested label switching path as permitted when the packet transfer by the label switching is judge as permitted for any packet stream from the starting point node/network of the requested label switching path.

3. The router device of claim 1, wherein the control unit also checks authentication of the request message, and judges the set up of the requested label switching path as permitted when the request message is authenticated as a message truly transmitted from the starting point node/network of the requested label switching path.

4. The router device of claim 1, wherein the policy information stored in the memory unit also indicates a permitted packet stream for which the packet transfer by the label switching is to be permitted from each permitted starting point, and the control unit judges whether or not to permit the set up of the requested label switching path by also comparing the stream information contained in the request message as received by the receiving unit with the policy information as stored in the memory unit.

5. The router device of claim 1, wherein the stream information contained in the request message received by the receiving unit indicates the desired packet stream to be transferred through the requested label switching path by specifying a source of the desired packet stream.

6. The router device of claim 1, wherein the control unit also controls the switch unit to discard received packets belonging to the desired packet stream, when the set up of the requested label switching path is judged as not permitted.

7. The router device of claim 1, further comprising a unit for applying a network layer processing to received packets belonging to the desired packet stream so as to transfer the received packets to a path for hop-by-hop transfer or an existing label switching path for the desired packet stream of which the router device is a starting point, when the set up of the requested label switching path is judged as not permitted.

8. The router device of claim 1, wherein the policy information stored in the memory unit also indicates a permitted communication quality by which the packet transfer by the label switching is to be permitted from each permitted starting point, the request message received by the receiving unit also contains a communication quality information indicating a desired communication quality for the requested label switching path, and the control unit judges whether or not to permit the set up of the requested label switching path by also comparing the communication quality information contained in the request message as received by the receiving unit with the policy information as stored in the memory unit.

9. The router device of claim 8, wherein the control unit also controls the switch unit to transfer the received packets to an existing label switching path for the desired packet stream with a communication quality lower than the desired communication quality, when the set up of the requested label switching path is judged as not permitted because the desired communication quality is higher than the permitted communication quality.

10. The router device of claim 1, wherein the router device is located at a boundary of a network segment, and
   the control unit also transmits a control message indicating a permission of the set up of the requested label switching path to an internal router of the network segment, so as to enable the internal router to carry out the set up of the requested label switching path through the internal router without judging whether or not to permit the set up of the requested label switching path based on the policy information at the internal router, when the set up of the requested label switching path is judged as permitted.

11. The router device of claim 1, wherein the policy information stored in the memory unit also indicates a permitted neighboring node/network from which the packet transfer by the label switching is to be permitted, the request message received by the receiving unit also contains a message source information indicating a source of the request message, and the control unit judges whether or not to permit the set up of the requested label switching path by also comparing the message source information contained in the request message as received by the receiving unit with the policy information as stored in the memory unit.

12. The router device of claim 11, wherein the control unit also checks authentication of the request message, and judges the set up of the requested label switching path as permitted when the request message is authenticated as a message truly transmitted from the starting point node/network of the requested label switching path through the permitted neighboring node/network.

13. The router device of claim 1, wherein the policy information stored in the memory unit also indicates a permitted ending point of a label switching path for which the packet transfer by the label switching is to be permitted, and the control unit judges whether or not to permit the set up of the requested label switching path by also comparing an ending point information, which is either contained in the request message as received by the receiving unit or derived from the stream information contained in the request message as received by the receiving unit, with the policy information as stored in the memory unit.

14. A router device, comprising:
   a switch unit for carrying out a label switching with respect to entered packets according to a correspondence between an input side label for identifying a channel from which a packet stream is to be entered and an output side label for identifying a channel from which the packet stream is to be outputted;
   a memory unit for storing a policy information indicating a permitted neighboring node/network from which a packet transfer by the label switching is to be permitted;
   a receiving unit for receiving a request message for requesting a set up of a requested label switching path through the router device, the request message containing a message source information indicating a source of the request message and a stream information indicating a desired packet stream to be transferred through the requested label switching path; and
   a control unit for judging whether or not to permit the set up of the requested label switching path by comparing the message source information contained in the request message as received by the receiving unit with the policy information as stored in the memory unit, and setting up the requested label switching path through the router device for the desired packet stream indicated by the stream information contained in the request message as received by the receiving unit when the set up of the requested label switching path is judged as permitted.

15. The router device of claim 14, wherein the control unit also checks authentication of the request message, and judges the set up of the requested label switching path as permitted when the request message is authenticated as a message truly transmitted from the permitted neighboring node/network.

16. The router device of claim 14, wherein the policy information stored in the memory unit also indicates a packet stream for which the packet transfer by the label switching is to be permitted from each permitted neighboring node/network, and the control unit judges whether or not to permit the set up of the requested label switching path by also comparing the stream information contained in the request message as received by the receiving unit with the policy information as stored in the memory unit.

17. The router device of claim 14, wherein the control unit also controls the switch unit to discard received packets belonging to the desired packet stream, when the set up of the requested label switching path is judged as not permitted.

18. The router device of claim 14, further comprising a unit for applying a network layer processing to received packets belonging to the desired packet stream so as to transfer the received packets to a path for hop-by-hop transfer or an existing label switching path for the desired packet stream of which the router device is a starting point, when the set up of the requested label switching path is judged as not permitted.

19. The router device of claim 14, wherein the policy information stored in the memory unit also indicates a permitted communication quality by which the packet transfer by the label switching is to be permitted from each permitted neighboring node/network, the request message received by the receiving unit also contains a communication quality information indicating a desired communication quality for the requested label switching path, and the control unit judges whether or not to permit the set up of the requested label switching path by also comparing the communication quality information contained in the request message as received by the receiving unit with the policy information as stored in the memory unit.

20. The router device of claim 19, wherein the control unit also controls the switch unit to transfer the received packets to an existing label switching path for the desired packet stream with a communication quality lower than the desired communication quality, when the set up of the requested label switching path is judged as not permitted because the desired communication quality is higher than the permitted communication quality.

21. The router device of claim 14, wherein the router device is located at a boundary of a network segment, and
the control unit also transmits a control message indicating a permission of the set up of the requested label switching path to an internal router of the network segment, so as to enable the internal router to carry out the set up of the requested label switching path through the internal router without judging whether or not to permit the set up of the requested label switching path based on the policy information at the internal router, when the set up of the requested label switching path is judged as permitted.

22. The router device of claim 14, wherein the control unit sets up the requested label switching path through the router device without judging whether or not to permit the set up of the requested label switching path-when the source of the request message is judged as a node located within a network segment to which the router device belongs.

23. A router device, comprising:
a switch unit for carrying out a label switching with respect to entered packets according to a correspondence between an input side label for identifying a channel from which a packet stream is to be entered and an output side label for identifying a channel from which the packet stream is to be outputted;
a memory unit for storing a policy information indicating a permitted packet stream for which a packet transfer by the label switching is to be permitted;
a receiving unit for receiving a request message for requesting a set up of a requested label switching path through the router device, the request message containing a stream information indicating a desired packet stream to be transferred through the requested label switching path; and
a control unit for judging whether or not to permit the set up of the requested label switching path by comparing the stream information contained in the request message as received by the receiving unit with the policy information as stored in the memory unit, and setting up the requested label switching path through the router device for the desired packet stream indicated by the stream information contained in the request message as received by the receiving unit when the set up of the requested label switching path is judged as permitted.

24. The router device of claim 23, wherein the policy information stored in the memory unit also indicates a permitted communication quality by which the packet transfer by the label switching is to be permitted for each permitted packet stream, the request message received by the receiving unit also contains a communication quality information indicating a desired communication quality for the requested label switching path, and the control unit judges whether or not to permit the set up of the requested label switching path by also comparing the communication quality information contained in the request message as received by the receiving unit with the policy information as stored in the memory unit.

25. The router device of claim 24, wherein the control unit also controls the switch unit to transfer the received packets to an existing label switching path for the desired packet stream with a communication quality lower than the desired communication quality, when the set up of the requested label switching path is judged as not permitted because the desired communication quality is higher than the permitted communication quality.

26. The router device of claim 23, wherein the router device is located at a boundary of a network segment, and
the control unit also transmits a control message indicating a permission of the set up of the requested label switching path to an internal router of the network segment, so as to enable the internal router to carry out the set up of the requested label switching path through the internal router without judging whether or not to permit the set up of the requested label switching path based on the policy information at the internal router, when the set up of the requested label switching path is judged as permitted.

27. A router device, comprising:
a switch unit for carrying out a label switching with respect to entered packets according to a correspondence between an input side label for identifying a channel from which a packet stream is to be entered and an output side label for identifying a channel from which the packet stream is to be outputted;
a memory unit for storing a policy information indicating a permitted ending point of a label switching path for which a packet transfer by the label switching is to be permitted;
a receiving unit for receiving a request message for requesting a set up of a requested label switching path through the router device, the request message containing a stream information indicating a desired packet stream to be transferred through the requested label switching path; and
a control unit for judging whether or not to permit the set up of the requested label switching path by comparing an ending point information, which is either contained in the request message as received by the receiving unit or derived from the stream information contained in the request message as received by the receiving unit, with the policy information as stored in the memory unit, and setting up the requested label switching path through the router device for the desired packet stream indicated by the stream information contained in the request message as received by the receiving unit when the set up of the requested label switching path is judged as permitted.

28. A method for controlling label switching path set up at a router device, comprising the steps of:
storing a policy information indicating a permitted starting point of a label switching path for which a packet transfer by a label switching is to be permitted;
receiving a request message for requesting a set up of a requested label switching path through the router device, the request message containing a starting point information indicating a starting point node/network of the requested label switching path and a stream information indicating a desired packet stream to be transferred through the requested label switching path;
judging whether or not to permit the set up of the requested label switching path by comparing the starting point information contained in the request message as received by the receiving step with the policy information as stored by the storing step; and setting up the requested label switching path through the router device for the desired packet stream indicated by the stream information contained in the request message as received by the receiving step when the set up of the requested label switching path is judge as permitted by the judging step.

29. A method for controlling label switching path set up at a router device, comprising the steps of:

storing a policy information indicating a permitted neighboring node/network from which a packet transfer by a label switching is to be permitted;

receiving a request message for requesting a set up of a requested label switching path through the router device, the request message containing a message source information indicating a source of the request message and a stream information indicating a desired packet stream to be transferred through the requested label switching path;

judging whether or not to permit the set up of the requested label switching path by comparing the message source information contained in the request message as received by the receiving step with the policy information as stored by the storing step; and setting up the requested label switching path through the router device for the desired packet stream indicated by the stream information contained in the request message as received by the receiving step when the set up of the requested label switching path is judged as permitted by the judging step.

30. A method for controlling label switching path set up at a router device, comprising the steps of:

storing a policy information indicating a permitted packet stream for which a packet transfer by a label switching is to be permitted;

receiving a request message for requesting a set up of a requested label switching path through the router device, the request message containing a stream information indicating a desired packet stream to be transferred through the requested label switching path;

judging whether or not to permit the set up of the requested label switching path by comparing the stream information contained in the request message as received by the receiving step with the policy information as stored by the storing step; and setting up the requested label switching path through the router device for the desired packet stream indicated by the stream information contained in the request message as received by the receiving step when the set up of the requested label switching path is judged as permitted by the judging step.

31. A method for controlling label switching path set up at a router device, comprising the steps of:

storing a policy information indicating a permitted ending point of a label switching path for which a packet transfer by a label switching is to be permitted;

receiving a request message for requesting a set up of a requested label switching path through the router device, the request message containing a stream information indicating a desired packet stream to be transferred through the requested label switching path;

judging whether or not to permit the set up of the requested label switching path by comparing an ending point information, which is either contained in the request message as received by the receiving step or derived from the stream information contained in the request message as received by the receiving step, with the policy information as stored by the storing step; and setting up the requested label switching path through the router device for the desired packet stream indicated by the stream information contained in the request message as received by the receiving step when the set up of the requested label switching path is judge as permitted by the judging step.

* * * * *